United States Patent [19]
Wang et al.

[11] Patent Number: 5,903,842
[45] Date of Patent: May 11, 1999

[54] SYSTEM AND METHOD FOR ALLOCATING FREQUENCY CHANNELS IN A TWO-WAY MESSAGING NETWORK

[75] Inventors: Zhonghe Wang, Lakeworth; Robert J. Schwendeman, Pompano Beach, both of Fla.

[73] Assignee: Motorola, Inc., Schaumburg, Ill.

[21] Appl. No.: 09/103,775

[22] Filed: Jun. 24, 1998

Related U.S. Application Data

[62] Division of application No. 08/980,297, Nov. 28, 1997, which is a division of application No. 08/502,399, Jul. 14, 1995, Pat. No. 5,737,691.

[51] Int. Cl.$^6$ .................................................. H04B 1/00
[52] U.S. Cl. ........................................... 455/450; 455/422
[58] Field of Search ..................................... 455/422, 450, 455/509, 452, 512, 63, 103, 67.3, 67.1, 453

[56] References Cited

U.S. PATENT DOCUMENTS

| | | | |
|---|---|---|---|
| 4,736,453 | 4/1988 | Schloemer | 455/67.3 |
| 5,093,927 | 3/1992 | Shanley | 455/63 |
| 5,148,548 | 9/1992 | Meche et al. | 455/63 |
| 5,157,709 | 10/1992 | Ohteru | 455/63 |
| 5,280,630 | 1/1994 | Wang | 455/63 |
| 5,293,640 | 3/1994 | Gunmar et al. | 455/62 |
| 5,410,737 | 4/1995 | Jones | 455/63 |
| 5,475,866 | 12/1995 | Ruthenberg | 455/63 |
| 5,497,503 | 3/1996 | Rydberg et al. | 455/62 |
| 5,507,007 | 4/1996 | Gunmar et al. | 455/63 |
| 5,511,233 | 4/1996 | Otten | 455/63 |
| 5,603,085 | 2/1997 | Shedlo | 455/63 |
| 5,603,092 | 2/1997 | Stjernholm | 455/63 |
| 5,649,303 | 7/1997 | Hess et al. | 455/63 |

*Primary Examiner*—Reinhard J. Eisenzopf
*Assistant Examiner*—Marsha D. Banks-Harold
*Attorney, Agent, or Firm*—Philip P. Macnak

[57] ABSTRACT

In order to allocate frequency channels to transmitter units, the transmitter units are grouped in zones, each zone having one or more transmitter units (10, 20, 30) therein. A system controller (40) calculates a zone priority value which is a function of the zone's message traffic level and message latency. The zone priority value determines the order in which a zone is assigned a frequency channel. A channel priority value is calculated for each channel or sub-channel that can be accessed by the transmitter units (10, 20, 30) in the zone based on a probability of success and a mean quality margin value wherein the priority value of a channel determines the order in which an available channel is considered for assignment to a zone. A proposed channel is assigned to a given zone only if the proposed channel passes a channel quality check. The channel quality check may be based on co-channel and adjacent channel interference values. Alternatively, the channel quality check may be based on a determination of whether a channel proposed for assignment to a given zone is currently in use by another zone that is correlated with the given zone. Zones are merged and divided in order to provide increasing system capacity and better channel quality as the customer demands grow.

14 Claims, 14 Drawing Sheets

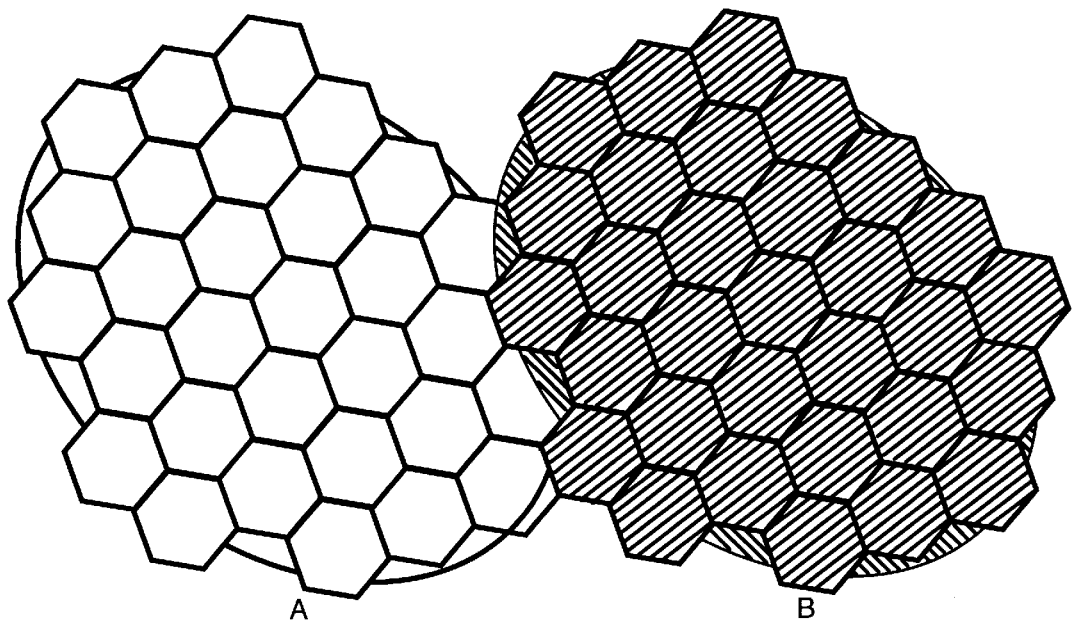
FIG. 2
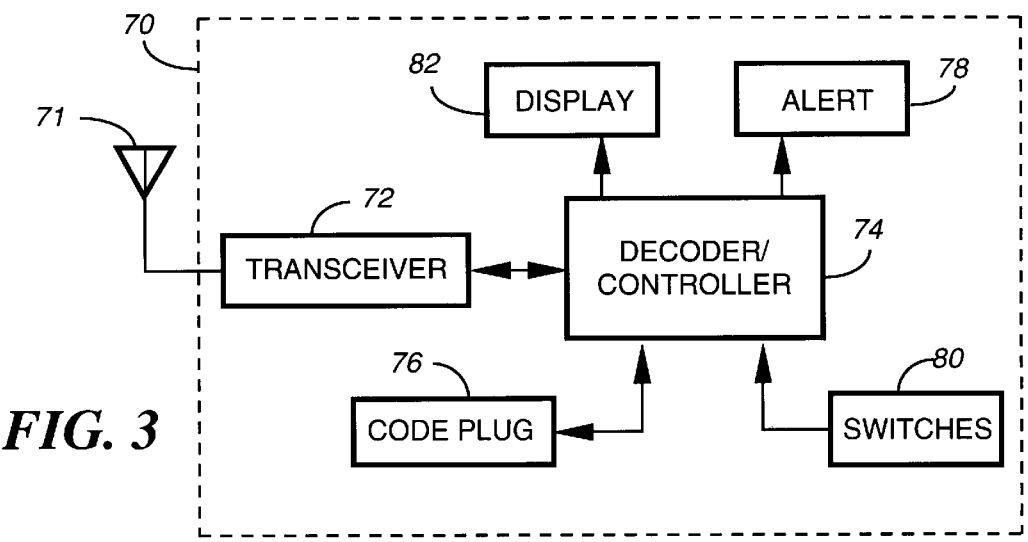
FIG. 3
FIG. 4
| 1 | 2 | 3 | 4 | 5 | 6 | 7 | 8 | 9 | 10 | 11 | 12 |
|---|---|---|---|---|---|---|---|---|----|----|----|
| I1 | I2 | I3 | I4 | I5 | I6 | I7 | I8 | I9 | I10 | I11 | I12 |
| A1 | A2 | A3 | A4 | A5 | A6 | A7 | A8 | A9 | A10 | A11 | A12 |

SYSTEM AND METHOD FOR ALLOCATING FREQUENCY CHANNELS IN A TWO-WAY MESSAGING NETWORK

CROSS REFERENCE TO RELATED APPLICATIONS

This application is a divisional of U.S. patent application Ser. No. 09/980,297 filed Nov. 28, 1997, which is a divisional of U.S. patent application Ser. No. 08/502,399, filed on Jul. 14, 1995, issued Apr. 8, 1998 as U.S. Pat. No. 5,737,691.

FIELD OF INVENTION

The present invention relates to a system and method for allocating frequency channels to a number of zones, each zone formed to include one or more transmitter units and more particularly, to such a system and method that allocates a proposed channel to a given zone only if the channel passes a channel quality check that may be based on co-channel and adjacent channel interferences or on whether a channel proposed for assignment to a given zone is currently in use by a zone that is correlated with the given zone.

BACKGROUND OF THE INVENTION

In known two-way radio frequency communication networks, a number of transmitter units are used to transmit messages on various frequency channels to portable selective call communication devices such as a two-way pager, cellular telephone, radio, etc. One or more receivers are associated with each transmitter for receiving messages from a portable two-way device. In accordance with one known method for allocating frequency channels as described in U.S. Pat. No. 5,280,630, each base station which includes a transceiver and controller determines the frequency channel to be used to transmit a message using a preferred channel list thereby providing a fully distributed channel allocation scheme wherein each base station can operate independently to carry out this function. The preferred channel list is maintained at each base station of the network wherein the base stations use real time measurements of channel quality and a history of the channel quality to determine the preferred channel list for channel allocation purposes. However, real time measurements of the current channel quality can be costly. Using only statistics of the past history is not satisfactory for channel allocation because such systems merely predict the channel quality and are not based on any real measurements.

Therefore there is a need to provide a channel allocation scheme that provides a balance among the competing factors of channel quality, system capacity, adaptivity, cost, complexity, fairness in terms of equal access, etc. It is noted that although some networks organize transmitters in zones for simulcasting an address of a selective call device, the actual messages are not simulcast to the device by all of the transmitters in the zone. Instead, a central controller determines which individual transmitter in a zone is to be selected for transmitting the actual message. See for example U.S. Pat. Nos. 4,670,906 and 4,918,437. Heretofore, when transmitter units have been grouped in zones, the zones have not been adaptive; nor have they been employed to provide a channel allocation scheme that meets the desired needs.

SUMMARY OF THE INVENTION

In accordance with the present invention, the disadvantages of prior frequency channel allocation schemes for a two-way messaging network have been overcome. The system and method of the present invention adaptively groups transmitter units in zones for channel allocation purposes, each zone having one or more transmitter units therein for transmitting messages to a portable selective call communication device. A proposed channel is assigned to a given zone only if the channel passes a channel quality check. The channel allocation scheme of the present invention ensures good channel quality with low cost and complexity while having a high message capacity and being adaptive to changing environments and the resulting demands on the system.

More particularly, in accordance with the present invention, a zone priority value is calculated for each of the zones wherein the zone priority value determines the order in which a zone is assigned a frequency channel. Further, for each zone, a channel priority value is calculated for each of the frequency channels or sub-channels that the transmitter units of the zone can access. The channel priority value determines the order in which an available channel is considered for assignment to the zone. The first proposed, available channel that has an acceptable channel quality is assigned to the zone for the transmission of messages by each of the transmitter units in the zone.

In accordance with one embodiment of the present invention wherein each zone includes only one transmitter unit, the channel quality check may be based on co-channel and adjacent channel interference values derived from real measurements taken when the transmitter units are added to the network and updated whenever the network deems it necessary. In a second embodiment, each of the zones includes one or more transmitter units and is such that the channel quality check is based on a determination of whether a channel proposed for assignment to a given zone is currently in use by another zone that is correlated with the given zone. The zones are merged and divided in accordance with one feature of the present invention to provide increasing system capacity and better channel quality as the customer demands grow while providing a simple, low cost initial system.

These and other advantages and novel features of the present invention, as well as details of an illustrated embodiment thereof, will be more fully understood from the following description and drawings.

BRIEF DESCRIPTION OF THE DRAWING

FIG. 2 is an illustration of a pair of transmitter cells each having an associated set of receiver coverage cells depicted by hexagons;

FIG. 3 is a block diagram of a two-way selective call communication device such as a pager;

FIG. 4 is an illustration of an important interference matrix stored for each transmitter unit in accordance with one embodiment of the present invention;

DESCRIPTION OF THE PREFERRED EMBODIMENT

Figure 1:
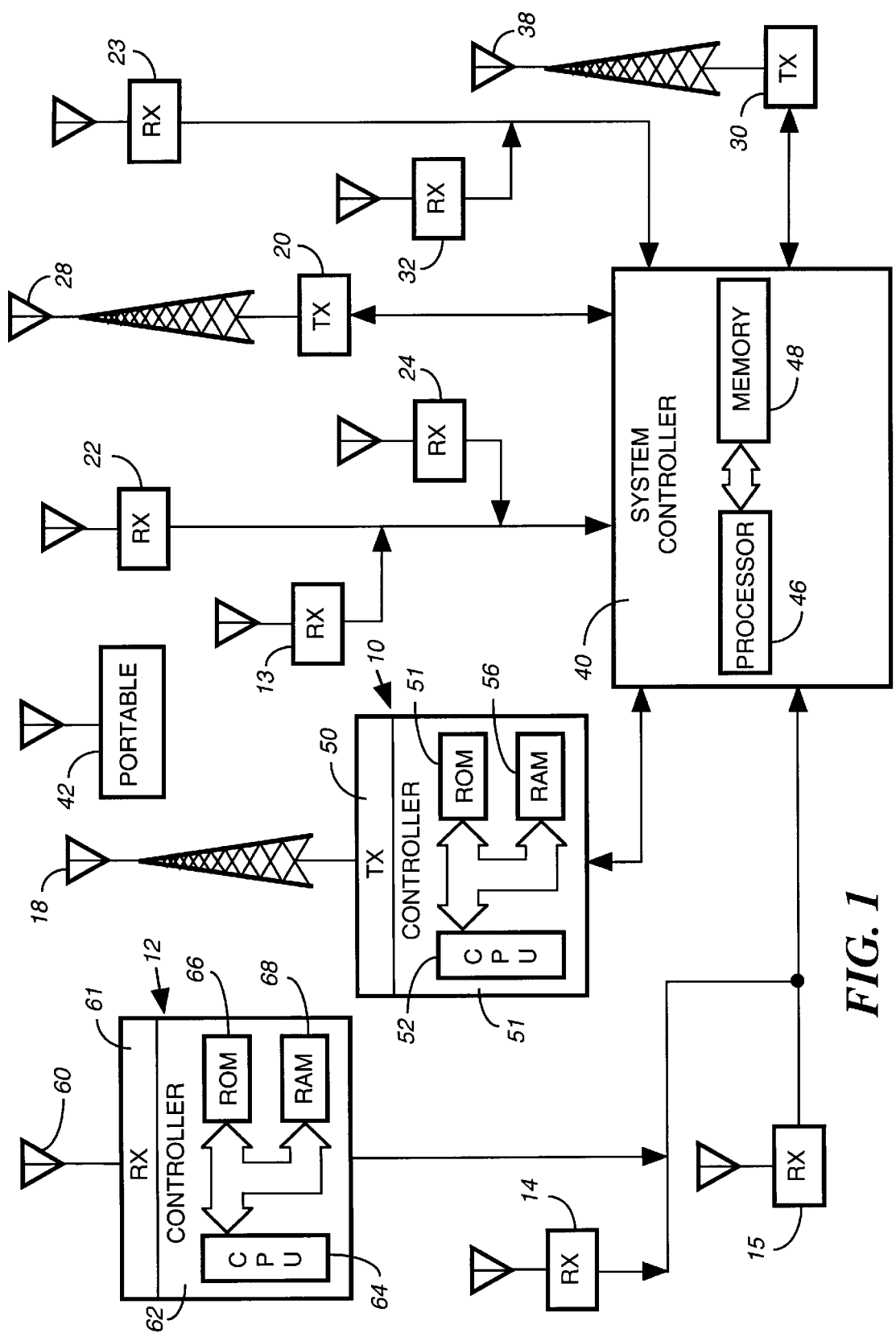
FIG. 1 is a block diagram of a two-way messaging network illustrating a number of transmitter units and associated receiver units for communicating with a portable two-way selective call communication device.

A two-way messaging network as shown in FIG. 1 includes a number of transmitter units 10, 20, 30 and associated receiver units 12–15, 22–24 and 32 coupled to a system controller 40. The system controller 40 assigns frequency channels and/or sub-channels to the transmitter units for transmitting messages thereon to a portable, two-way selective call communication device 42 such as a radio, cellular telephone, two-way pager as described in detail below, etc.

For paging applications, the system controller 40 receives input messages or page initiation messages from a telephone or the like. The system controller 40 includes a processor 46 that operates in accordance with software and data stored in a memory 48 for generating a paging message in accordance with a particular signaling protocol, for example, a four-level FSK signal protocol such as ReFLEX. The paging message is coupled from the system controller 40 to a single transmitter unit 10, 20, 30 in accordance with one embodiment of the present invention or to a number of transmitter units in a zone in accordance with a second embodiment of the present invention.

Each of the transmitter units 10, 20, 30 includes a transmitter 50 and controller 51 as shown for the transmitter unit 10. The controller 51 of the transmitter unit includes a central processing unit (CPU) 52 that operates in accordance with software stored in a read only type of memory 54 and data stored in a random access type of memory 56 in order to control the operations of the transmitter unit 10, 20, 30.

A queue which may be formed in a portion of the memory 56 of a transmitter unit 10, 20, 30 stores messages to be transmitted by the unit when a frequency channel is assigned thereto by the system controller 40. The transmitter unit 10, 20, 30 transmits a message via a respective antenna 18, 28, 38 for reception by a particular portable two-way selective call communication device 42 in accordance with an identification of the portable device that is included in the transmitted message.

A portable two-way selective call communication device 42 in the form of a pager 70 is shown in FIG. 3. The pager 70 includes an antenna 71 for intercepting transmitted radio frequency (RF) signals and for transmitting RF signals. The antenna 71 couples a received signal to a transceiver 72 wherein the transceiver 72 produces a data stream representative of a demodulated received signal that is coupled to a decoder/controller 74. The transceiver 72 is also responsive to a modulation input such as data received from the decoder/controller 74 to frequency modulate a carrier signal for transmission out from the pager 70. As is well known in the art, the decoder/controller 74 may include a central processing unit such as a microprocessor or the like for processing demodulated signal information in accordance with software stored in a memory of the decoder/controller 74. The decoder/controller 74 is also responsive to inputs from one or more switches 80 or other input devices to generate data that is coupled to the transceiver 72 for transmission out from the pager 70. The RF signals transmitted by the transmitter units 10, 20, 30 typically include an address that identifies a particular pager 70 as well as an associated alpha-numeric and/or voice message. The decoder/controller 74 decodes a received address by comparing it with one or more addresses stored in a code plug or code memory 76. If the decoder/controller 74 detects a match between a received address and a stored address, an alert signal is generated by a device 78 so as to alert a user that a message has been received by the pager 70. The alert signal may be an audible and/or a tactile alert such as a silent vibrating alert. The switches 80 may be actuated by a user to select between the different types of alerts as well as for causing a message stored in the memory of the decoder/controller 74 to be accessed for display on a display 82. The switches 80 may also provide additional functions such as reset, read, delete, etc. as is well known.

The receiver units 12–15, 22–24 and 32 of the network receive in-bound message traffic transmitted from the portable two-way selective call communication device 42. Each of the receiver units as shown for the receiver unit 12 includes an antenna 60 for intercepting messages transmitted from a portable device 42 as well as a receiver 61 and controller 62 for demodulating and decoding intercepted radio frequency messages. The controller 62 of each of the receiver units includes a central processing unit 64 that operates in accordance with software stored in a read only type of memory 66 arid data stored in a random access type of memory 68.

Each of the transmitter units 10, 20, 30 of the network are positioned to maximize the area covered by message transmissions and to assure good signal quality. A group of receiver units is associated with an individual transmitter unit so that the group of receiver units covers the entire area that is covered by the transmitter unit. For example, as shown in FIG. 1, the receiver units 12–15 may be associated with the transmitter unit 10, the receiver units 22–24 may be associated with the transmitter unit 20 and the receiver unit 32 may be associated with the transmitter unit 30. Although it is possible that some receiver units may cover an area outside of the area that is covered by their associated transmitter unit or may even cover an area that overlaps with the area covered by another transmitter unit, a receiver unit is preferably associated with only one transmitter unit. FIG. 2 illustrates the area or transmitter cell A covered by a single transmitter unit and its associated set of receiver units having receiver coverage cells indicated by the unshaded hexagons. FIG. 2 also illustrates the area or transmitter cell B covered by a second transmitter unit and its associated set of receiver units having receiver coverage cells indicated by the shaded hexagons. A zone is an independent paging area that consists of one or more transmitters wherein messages are simulcast by the transmitters in the zone.

Figure 5:
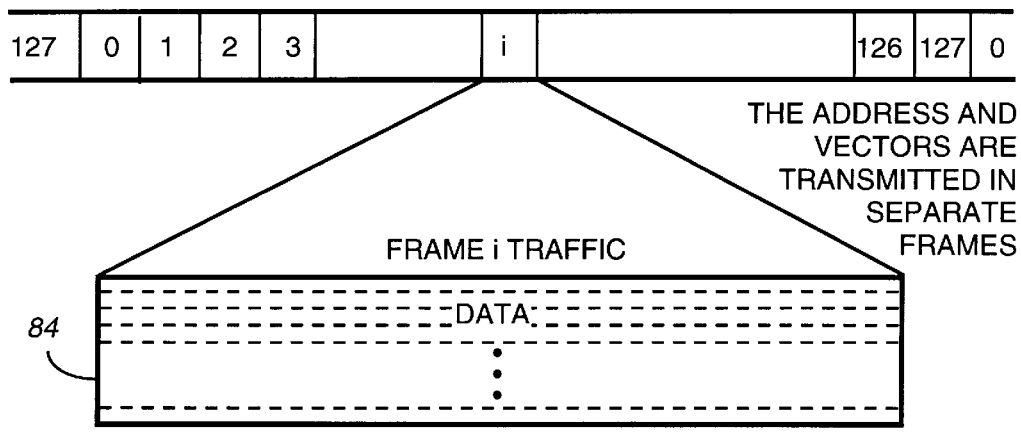
FIG. 5 is an illustration of the relationship of frame traffic and sub-channels.
Figure 6:
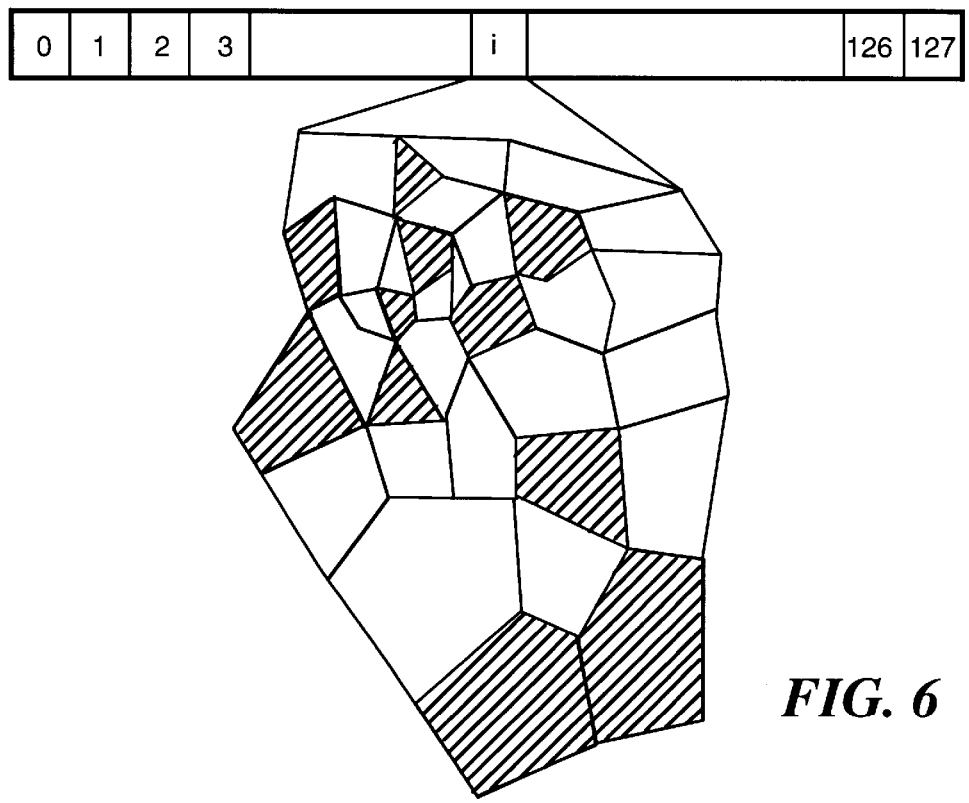
FIG. 6 is an illustration of the transmitter traffic in a given frame i.

In accordance with one embodiment of the present invention as described with reference to FIGS. 4–8, the system controller 40 assigns channels to zones, each zone having only a single transmitter unit therein. The network may have a sub-channel architecture such that each of the transmitters has the ability of concurrently accessing a number of sub-channels 84 as shown in FIG. 5 for message traffic in a frame i. In accordance with this first embodiment of the present invention, it is assumed that information identifying the location of a portable device 42 is available in accordance with any well-known method and that the portable accesses one sub-channel at a time. The message traffic is distributed such that each frame is associated with a group of customers, for example, sorted by n bits of their address. For example, if the last 3 bits of a portable device's address is 011, the customer may be associated with frame 3. The traffic for a given frame is then distributed among the various transmitter units 10, 20, 30. In accordance with one method of distributing frame traffic, the frame header, address and vector information associated with a message may be simulcast by all of the transmitter units in a zone. Based upon the known locations of the receiver units intercepting an acknowledgement transmitted by the portable device 42 receiving its address, the system controller 40 makes a decision as to which transmitter unit 10, 20, 30 is to transmit the message to the portable device 42. For example, the system controller 40 typically selects the transmitter unit in the transmitter cell or area in which the portable device is located for transmitting the message to the portable device as is well known. The frame traffic is thus distributed among the various transmitter units of the network. FIG. 6 illustrates the frame i message traffic as it is distributed to various transmitter units whose area of coverage is indicated by the shaded areas.

Figure 7:
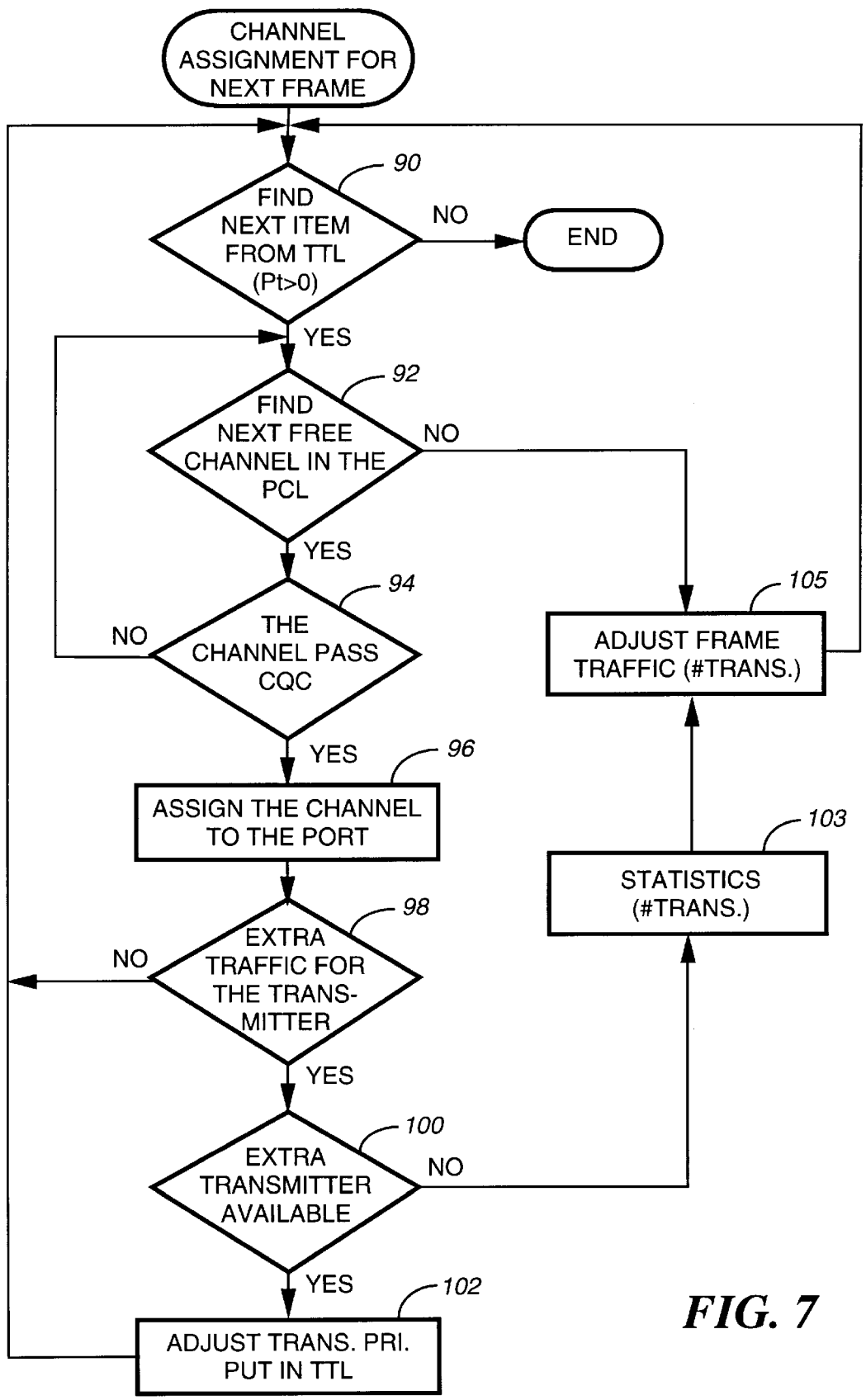
FIG. 7 is a flow chart illustrating a channel assignment sub-routine for one embodiment of the present invention wherein each zone includes a single transmitter unit.

For every frame, the system controller allocates sub-channels to the transmitter units 10, 20, 30 for transmitting the frame message traffic that has been distributed thereto in accordance with the channel allocation scheme depicted in FIG. 7. More particularly, for every frame and for every transmitter unit that is to transmit message traffic therein, the system controller 40 generates a transmitter priority value that is an increasing function of both the message traffic level and the latency of the message traffic of the cell. The traffic level or demand for the transmitter unit to transmit message traffic may be represented, for example, by the length of the queue storing the messages to be transmitted by the transmitter unit, i.e. the number of messages stored in the message queue of a transmitter unit. The latency is the waiting delay of the message traffic to be transmitted by the transmitter unit. The latency factor may take into account the requirements of the customers. For example, some customers of the messaging network need to receive their messages more urgently than other customers. As a result, these former customers can purchase a service that will send very frequent messages as opposed to the latter customers who might purchase a service where messages are sent at more spaced intervals. Each portable device 42 receives its address information in one or more particular frames according to the service purchased by the customer.

In order to determine which of the transmitter units 10, 20, 30 should be assigned a channel first, the system controller 40 sorts the transmitter units according to decreasing transmitter priority values to form a transmitter traffic list (TTL) that is used, as described below, so that a transmitter unit with a higher priority value will be serviced prior to a transmitter unit with a lower priority value.

The system controller also defines a channel priority value for each sub-channel that a transmitter unit can access. The channel priority values for each of the sub-channels of a particular transmitter unit are sorted according to decreasing values in a preferred channel list (PCL) that determines the order in which an available channel is considered for assignment to a particular transmitter unit. More particular, each channel priority value is a function of a probability of success (POS) and a mean quality margin. The mean quality margin is the mean value of an estimated quality q minus a threshold $Th_q$ where q is greater than $Th_q$. The threshold $Th_q$ is a lower bound on the quality for a channel to be considered a good channel. The probability of success and mean quality margin may be estimated in a moving window for adaptivity of the system as disclosed in U.S. Pat. No. 5,280,630 assigned to the assignee of the present invention and incorporated herein by reference. The channel priority value is an increasing function of the probability of success and a decreasing function of the mean quality margin.

It is noted that upon the installation of a new transmitter unit, the same channel priority value may be assigned to each of the sub-channels and the sub-channels randomly sorted to form an initial preferred channel list. After the transmitter units transmit their messages in a particular frame on the respectively assigned sub-channels, the system controller 40 determines whether the portable device 42 for which the message was intended, acknowledged the receipt of the message. If the system controller 40 receives an acknowledgement from the intended portable device 42 via a receiver unit, the possibility of success for the sub-channel on which the message was transmitted is increased for the transmitter unit thus increasing the channel priority value of the sub-channel as described in more detail below with reference to FIG. 5.

In order to obviate the need to make real time channel quality measurements, the system controller stores in its memory 48 for each of the transmitter units 10, 20, 30 in the network, an important interference matrix that is employed in the allocation of channels to the transmitter units as described below with reference to FIG. 7. The important interference matrix for each transmitter unit may take the form depicted in FIG. 4. The first row of the important interference matrix of a given transmitter unit includes information identifying each of the transmitter units that interferes with the given transmitter unit by more than a predetermined neglectable amount. The second row of the important interference matrix includes a value representing the estimated co-channel interference with the given transmitter unit caused by the interfering transmitter unit; whereas the third row of the important interference matrix stores values representing the estimated adjacent channel interference with the given transmitter unit caused by the interfering transmitter unit. The co-channel and adjacent channel interference values stored in the important interference matrix may be estimates based on real measurements taken when a transmitter unit is installed in the network. These values can subsequently be modified during the course of operation of the network when the need arises. The important interference matrix allows a channel allocation scheme to be implemented that takes into account a real measurement of channel quality without requiring a real time measurement.

More particularly, the system controller 40 allocates sub-channels to the transmitter units that are to transmit message traffic in a particular frame in accordance with the software routine depicted in FIG. 7. As shown therein, for a given frame, the system controller processor 46 finds the highest priority transmitter unit in the transmitter traffic list that has not already been serviced. Thereafter, the processor 46 proceeds from block 90 to block 92 to examine the preferred channel list associated with that given transmitter unit. Specifically, at block 92, the processor 46 finds the sub-channel in the given transmitter unit's preferred channel list with the highest channel priority value where the sub-channel is free or available such that no message traffic has been assigned to that sub-channel for the given transmitter unit in the particular frame. That sub-channel is then proposed for assignment to the given transmitter unit, the proposed channel being assigned if it passes a channel quality check performed by the processor at a block 94. During the channel quality check performed at block 94, the processor 46 determines whether any of the interfering transmitter units identified in the given transmitter unit's important interference matrix is using the same channel as the proposed channel or a channel adjacent to the proposed channel. If so, the processor 46 makes two checks. First, the processor 46 checks the important interference matrix of the given transmitter to determine if the proposed channel would be acceptable based upon the co-channel and/or adjacent channel data stored therein for any interfering transmitter unit currently using the same channel as or an adjacent channel to the proposed channel. For example, the processor 46 may sum the co-channel and adjacent channel values stored in the important interference matrix of the given transmitter for the interfering transmitters currently using the same channel as or an adjacent channel to the proposed channel, the processor 46 comparing the sum to an interference threshold. If the sum of the stored co-channel and adjacent channel interference values is greater than the interference threshold, the proposed channel is determined to be unacceptable for the given transmitter. The second check that is performed is a check of the important interference matrix of each of the interfering transmitters that are currently using the same channel as or an adjacent channel to the proposed channel to determine if the proposed channel would be acceptable based on the co-channel and adjacent channel data stored in the important interference matrices of the interfering transmitters for the given transmitter. Again, the processor 46 may sum the stored co-channel and adjacent channel values from these important interference matrices for the given transmitter and compare the sum to a threshold to determine the acceptability of the proposed channel for the transmitter units currently using the same channel or an adjacent channel thereto. Both of the first and second checks must be passed in order for the channel quality check to be passed at block 94 since a first transmitter might interfere more with a second transmitter than the second transmitter interferes with the first transmitter.

If the processor 46 determines that the channel quality check for a proposed channel assignment to a given transmitter is passed at block 94, the processor proceeds to block 96 to assign the proposed channel to the given transmitter unit. After assigning a channel to the given transmitter unit, the processor 46 proceeds to a block 98 to determine whether more than one channel is needed for the given transmitter unit because there are still a number of messages in the transmitter unit's queue that remain to be transmitted in the given frame. If not, the processor 46 proceeds back to block 90 to allocate a frequency channel to the next highest priority transmitter unit in the ordered transmitter traffic list. However, if the processor 46 determines at block 98 that there is still more message traffic for the given transmitter unit to send, the processor 46 proceeds to block 100 from block 98. At block 100, the processor 46 determines whether the transmitter unit has an extra transmitter. If so, the processor 46 proceeds to block 102 to adjust the transmitter priority value and the given transmitter unit is inserted back into the transmitter traffic list according to the adjusted transmitter priority value so that another frequency sub-channel can be assigned thereto. If the transmitter unit does not have an extra transmitter available as determined at block 100, the processor 46 proceeds to block 103. At block 103, the processor updates the memory 48 with information indicating that another transmitter might be needed. From block 103, the processor 46 proceeds to block 105 in order to adjust the frame traffic. For example, the processor 46 at block 105 may put the extra message traffic for the given transmitter unit in a later frame associated with the customer's portable device 42 for which the message was intended.

Figure 8:
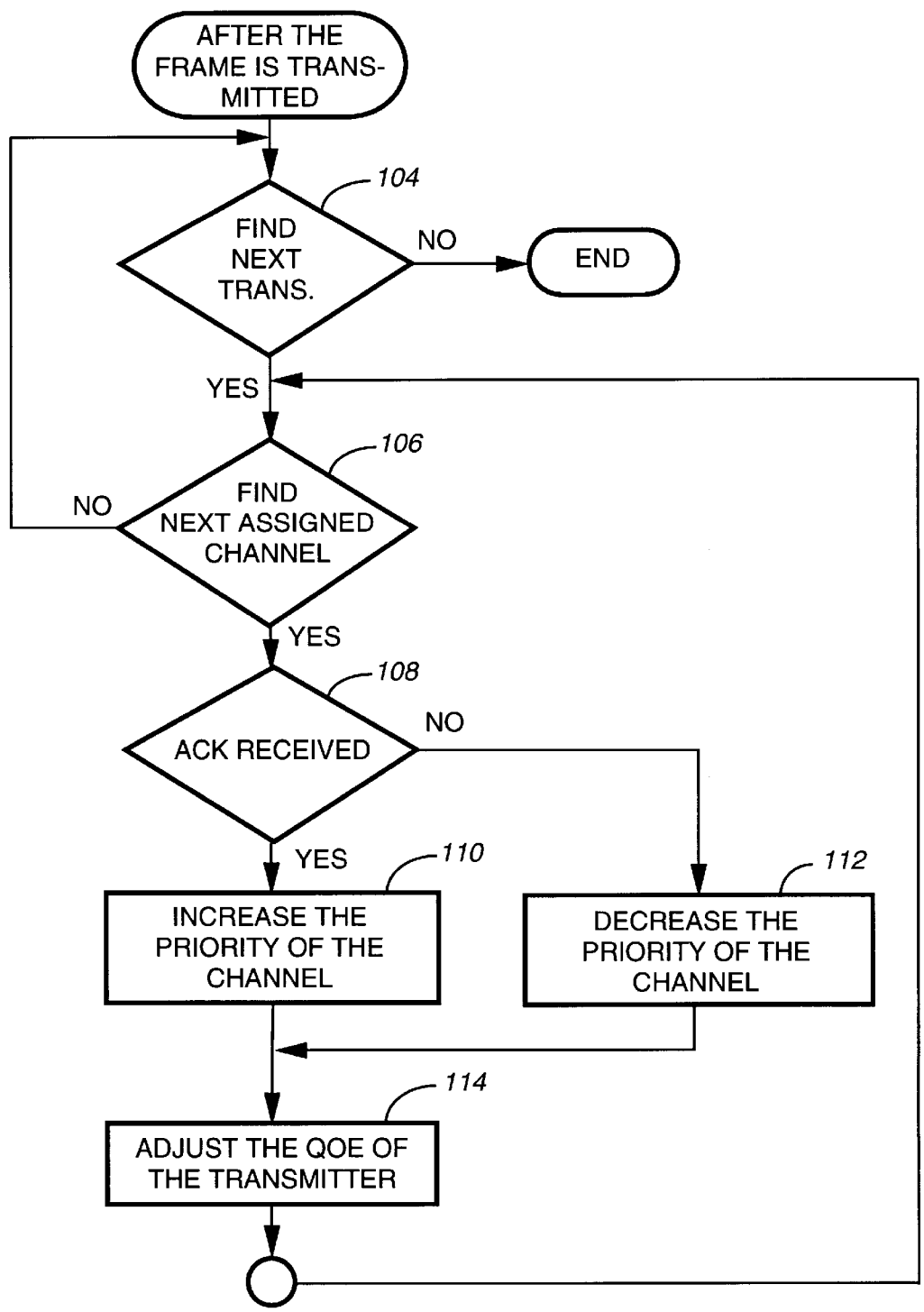
FIG. 8 is a flow chart illustrating a scheme for adjusting the priority of a channel for channel allocation purposes.

After the assignment of channels to each of the transmitter units that have messages to be transmitted in a given frame and after the transmission of those messages in the given frame, the system controller 40 implements the subroutine depicted in FIG. 8. In this subroutine, the controller 40 adjusts the channel priority values for sub-channels assigned to the transmitter units during the given frame and collects transmitter unit statistics. More particularly, after a given frame of messages has been transmitted, the system controller 40 finds a transmitter unit that was to transmit a message during the given frame. After finding a transmitter unit at block 104, the processor 46 proceeds to block 106 to determine whether that transmitter unit was assigned a sub-channel. If so, the processor proceeds to block 108. At block 108 the processor 46 determines whether an acknowledgement has been received from the portable device 42 for which the message transmitted on the assigned sub-channel was intended indicating that the intended portable device did receive the message transmitted on the assigned sub-channel. If so, the processor 46 increases the probability of success (POS) of the assigned sub-channel for the given transmitter unit. If an acknowledgement was not received, however, the processor 46 at a block 112 decreases the channel priority value of the assigned sub-channel since the quality of the assigned sub-channel was not good enough for the intended portable device to receive the transmitted message. From the respective blocks 110 and 112, the processor 46 proceeds to a block 114 to adjust a quality of estimation value (QOE) for the transmitter unit. The system controller 40 uses the quality of estimation value to determine whether the important interference matrix of the given transmitter needs adjustment, for example.

In accordance with a second embodiment of the present invention, channels are assigned to zones having one or more transmitter units therein so that all of the transmitter units in a given zone simulcast the message traffic as well as the address information to an intended portable device 42. This channel assignment strategy allows for an increasing message traffic capacity and the ubiquitous coverage requirements of the network's customers. The channel quality check performed in accordance with the second embodiment of the present invention assures that a proposed channel assignment to a given zone for an out-bound message will not interfere with any already assigned message traffic in a particular out-bound sub-channel by determining whether the given zone is correlated with any zone within which message traffic has already been assigned. Whether two zones are correlated depends on whether a receiver unit associated with a transmitter unit in one zone intercepts the same message, transmitted from a portable device 42, as intercepted by a receiver unit associated with a transmitter unit in another zone. In accordance with this embodiment, no registration by the customer is needed when the customer is roaming inside a zone.

Figure 9:
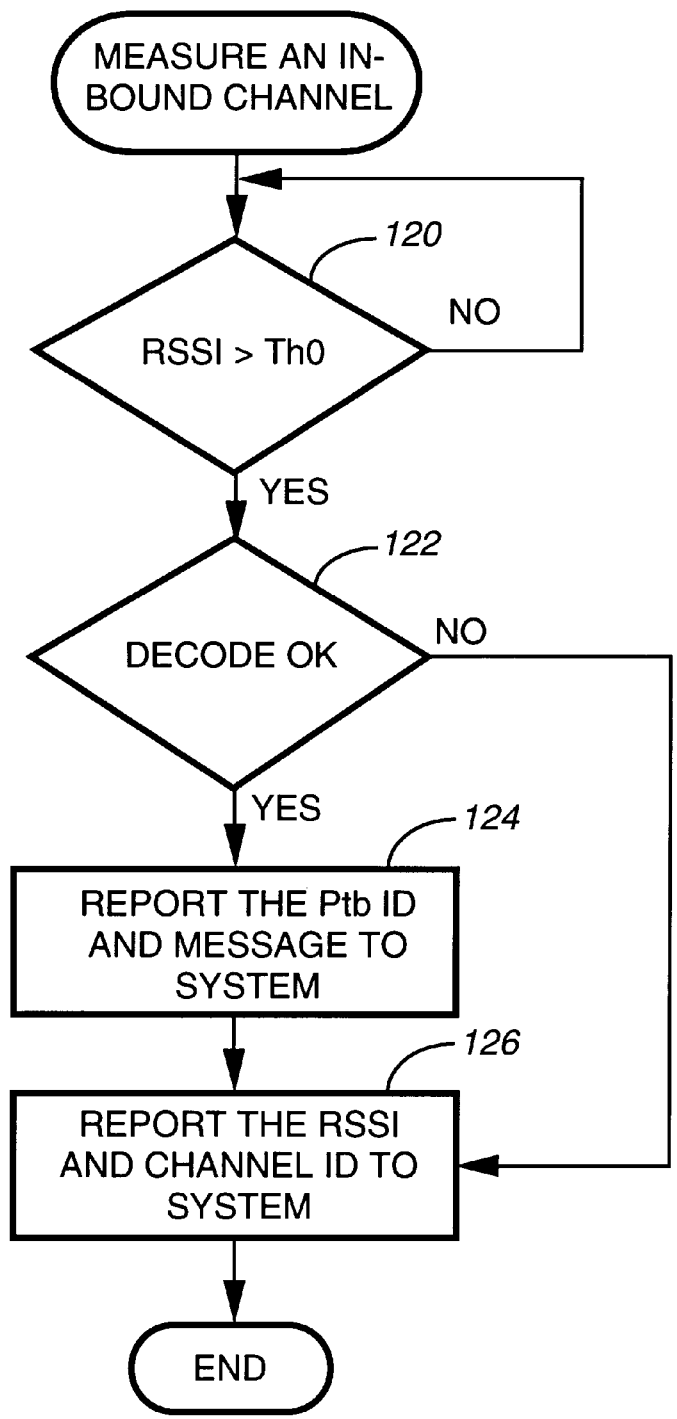
FIG. 9 is a flow chart illustrating the operation of a receiver unit in measuring and reporting the energy of an intercepted in-bound channel message in accordance with a second embodiment of the present invention.

In order to implement the second embodiment of the present invention, the receiver units 12–15, 22–24 and 32 measure the received energy on an in-bound channel from a portable device 42 where the address or ID of the portable device 42 is included in the in-bound channel message received from the portable device 42. More specifically, as shown in FIG. 9, upon receiving an in-bound channel request from a portable device 42, the CPU 64 of the receiver unit determines whether the energy received on the in-bound channel as represented by the received signal strength is greater than a received energy threshold $Th_0$. If the received signal strength of an intercepted request is greater than the threshold $Th_0$, the CPU 64 proceeds from block 120 to block 122 to attempt to decode the received message. If the receiver unit correctly decodes the in-bound request, as determined at block 122, the CPU 64 reports at block 124 the decoded message along with the ID of the portable device contained in the message to the system controller 40. At block 126 the CPU 64 also reports the received signal strength of the message and the identification of the channel on which the signal was received.

It is noted that there may be more than one receiver unit that detects the energy associated with a particular in-bound channel request. All of the receivers that receive the in-bound channel request energy transmitted from a given portable device 42 where the received signal strength is greater than the threshold $Th_0$, form a set of interfering receivers of the given portable device 42. If at least one of the receiver units of the interfering receiver unit set decodes the in-bound request correctly, an identification of each of the interfering receivers of the portable device 42 is stored in the memory 48 of the system controller 40. After receiving an in-bound request from one or more receiver units, the system controller 40 chooses a primary receiver unit for the portable device 42 that transmitted the request in-bound message. The primary receiver is the receiver unit that decoded the inbound request correctly. If more than one receiver unit decodes the in-bound request correctly, the receiver unit associated with the transmitter unit from which the highest energy is received by the portable device 42 or having the highest quality is chosen as the primary receiver. All of the other receiver units reporting the in-bound request with the same in-bound channel identification are designated as secondary receivers of the in-bound request from the portable device 42. Secondary receivers are subject to interference with regard to the proposed in-bound message traffic. Upon receiving in-bound channel requests, the system controller 40 divides the in-bound requests into frame traffic by distributing the in-bound requests among various frames according to any desired strategy. For example, the chosen strategy may be the same as used to distribute out-bound message traffic to a particular frame as discussed above. The system controller 40 then assigns a channel to the in-bound request and thereafter allocates an appropriate number of blocks in the assigned frame to the in-bound request as shown in FIG. 10.

Figure 10:
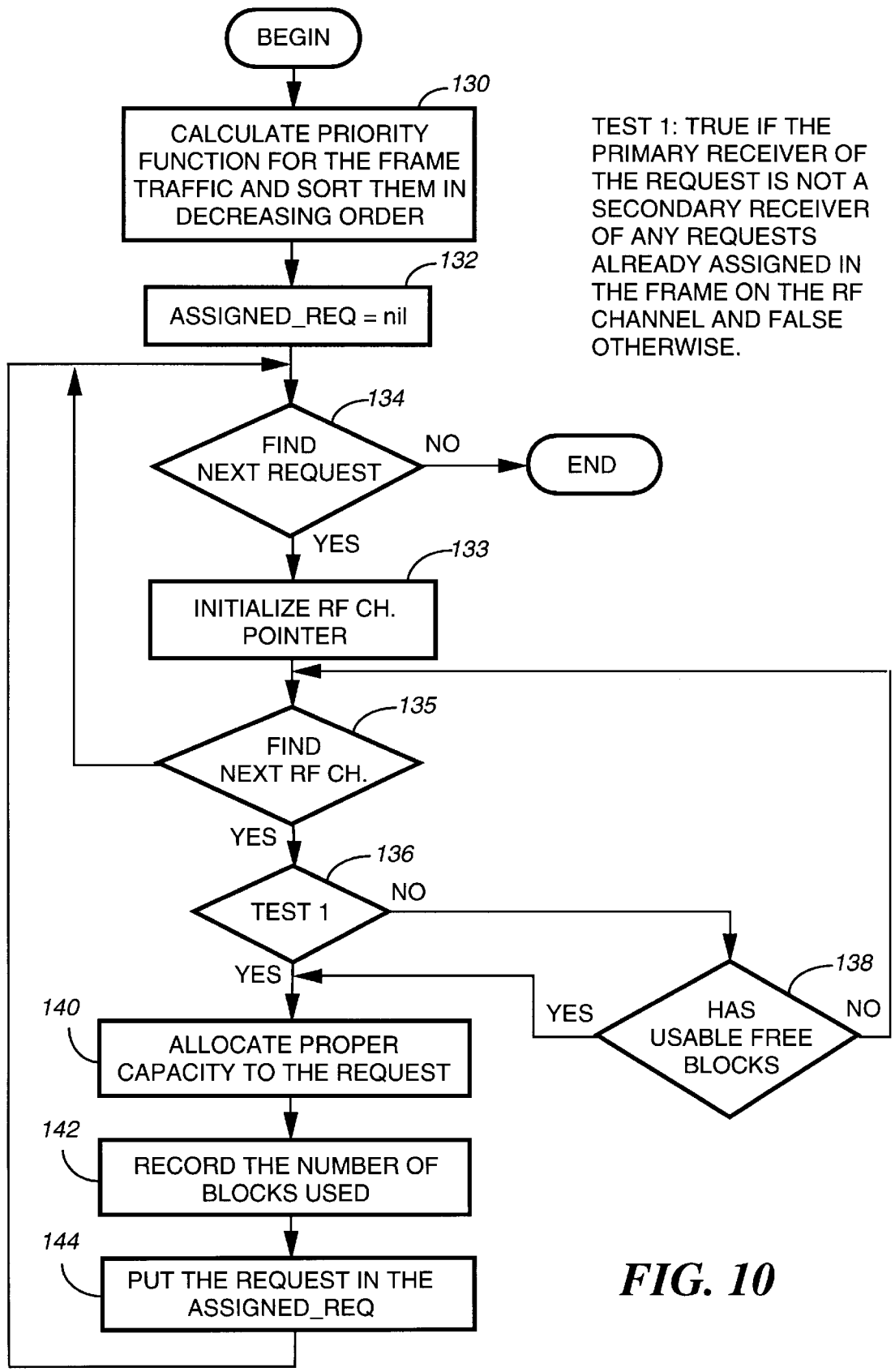
FIG. 10 is a flow chart illustrating a scheme for allocating blocks of a frame to inbound requests received from a portable device in accordance with the second embodiment of the present invention.

More particularly, in order to assign a channel and the requisite number of blocks in a frame to an in-bound channel request, the system controller processor 46 at a block 130 of FIG. 10 calculates a traffic priority value. The traffic priority value is a function of the waiting time of the message traffic, i.e. latency as described above and is also a function of the length of the message traffic request, as indicated for example, by the length thereof in the frame queue. The processor 46, after calculating the traffic priority values for the message traffic for a given frame, sorts the requests in decreasing order of the traffic priority value so that a request with a higher traffic priority value will be served sooner than a request with a lower traffic priority value. Thus, the fairness of the allocation scheme is improved. From block 130, the processor 46 proceeds to block 132 to initialize an assigned request list so that it is empty. Thereafter, at a block 134, the processor 46 finds the highest priority request from the list derived at block 130. At block 133 the processor 46 initializes an in-bound frequency channel pointer and if an in-bound channel is found at block 135, the processor assigns the found channel to the in-bound request. Next, at block 136 the processor 46 determines if the primary receiver of the request is a secondary receiver of any requests already assigned in the frame. If so, the processor 46 determines that the request has failed test 1 and proceeds from block 136 to block 138. At block 138 the processor 46 determines whether there are a sufficient number of blocks that are later in the frame that are free. If so, the processor proceeds from block 138 to block 140. Otherwise, the processor 46 proceeds from block 138 to block 134 to find the next highest priority request to process. If the processor 46 determines at block 136 that the primary receiver of the given request is not a secondary receiver of any request already assigned in the frame, the processor proceeds from block 136 to block 140. The processor 46 allocates at block 140 a sufficient number of blocks in the frame to the in-bound request. Thereafter, at block 142, the processor 46 records the number of blocks used in the memory 48 and at block 144 enters the request in the assigned request list.

Out-bound channel requests are based on in-bound channel requests in that the out-bound channel assignment depends on whether correlated zones are involved in the same in-bound channel request. This in turn depends on whether a receiver unit associated with a transmitter unit in one zone intercepts the same message transmitted from a portable device 42 as intercepted by a receiver unit associated with a different transmitter unit in another zone indicating that the transmitter units are correlated.

A correlation indicator (CI) is an estimation of the interference between multiple transmitters whereas a zone correlation indicator (ZCI) is a measurement of the interference between zones. These correlation indicators are based on the information collected from the system through a moving window such that the system can adapt to a slowly changing environment. The window size determines the stability and the adaptivity of the channel allocation scheme. A high value of the zone correlation indicator indicates a high interference between at least one transmitter in one zone and another transmitter in a second zone, thereby indicating that the zones should share bandwidth.

Figure 11:
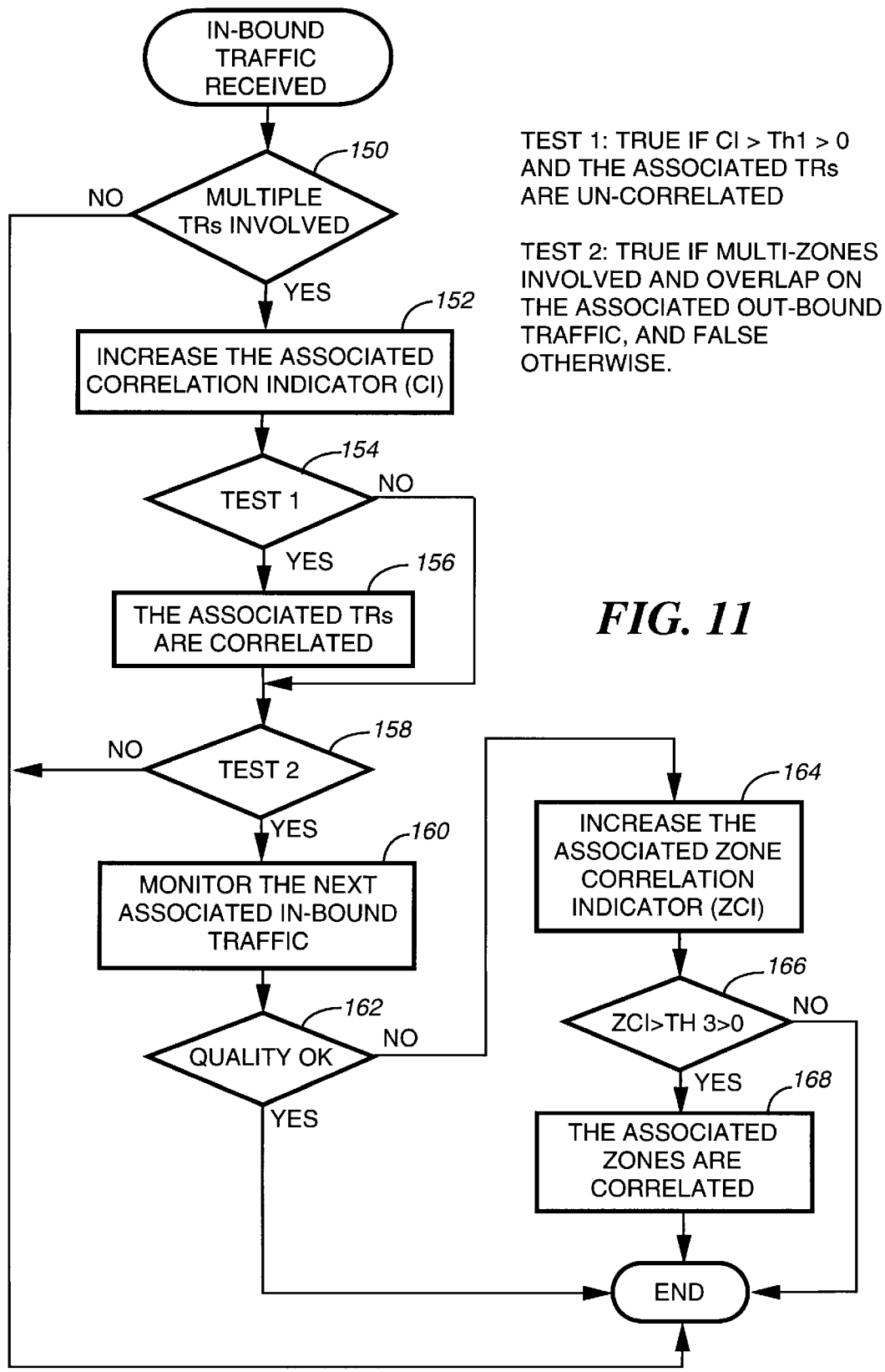
FIG. 11 is a flow chart illustrating a scheme for determining whether multiple transmitter units are correlated and for determining whether multiple zones are correlated.

Initially, the transmitter correlation indicator (CI) and the zone correlation indicator (ZCI) are set to zero and subsequently adjusted in accordance with a flow chart depicted in FIG. 11. As shown therein, the system controller processor 46 upon receiving an in-bound request from one or more receiver units determines at a block 50 whether multiple transmitter units are involved with the in-bound channel request. A transmitter unit is involved in an in-bound channel request if at least one of its associated receivers, as defined above, is a primary receiver or a secondary receiver of the request. If more than one transmitter unit is involved with a given in-bound request, the processor 46 at block 152 increases the correlation indicator associated with the multiple transmitter units that are involved with the request. Thereafter, the processor 46 proceeds to block 154 to implement test 1 of the routine to determine whether the multiple transmitters involved in the request were previously uncorrelated and have become correlated because their associated correlation indicator (CT) has increased above a transmitter unit correlation threshold, The. If so, test 1 is passed and the processor proceeds from block 154 to block 156 wherein the processor 46 stores information in the memory 48 indicating that the multiple transmitters are correlated.

Next, at block 158, the processor 46 implements test 2 in order to determine if multiple zones are involved in the given in-bound traffic request and whether there is an overlap on the out-bound message traffic associated with the given in-bound request. Multiple zones are involved in a given in-bound traffic request if at least one transmitter unit in one zone and another transmitter unit in a different zone are involved in the in-bound channel request as discussed above. There is an overlap on the out-bound traffic to be transmitted by a transmitter unit in one zone on a given channel in a given frame if a second transmitter unit in a second zone has traffic to be transmitted on the same channel in the same frame. If it is determined at block 158 that multiple zones are involved in a given in-bound traffic request and that there is overlap on the out-bound traffic, the processor 46 proceeds from block 158 to block 160. At block 162, the processor 46 monitors the next in-bound message associated with the given request on the assigned channel by determining whether an acknowledgement has been received from the pager. If an acknowledgement is not received from the pager within a predetermined period of time as determined by the processor at block 162, the processor 46 assumes that the cause was due to interference between the zones and the processor proceeds to block 164 to increase the zone correlation indicator associated with the multiple zones. Thereafter, at a block 166, the processor 46 determines whether the zone correlation indicator for the multiple zones is greater than a zone correlation threshold, $Th_3$ and if so, the processor 46 stores information in the memory 48 at block 168 indicating that the multiple zones are correlated.

Figure 12:
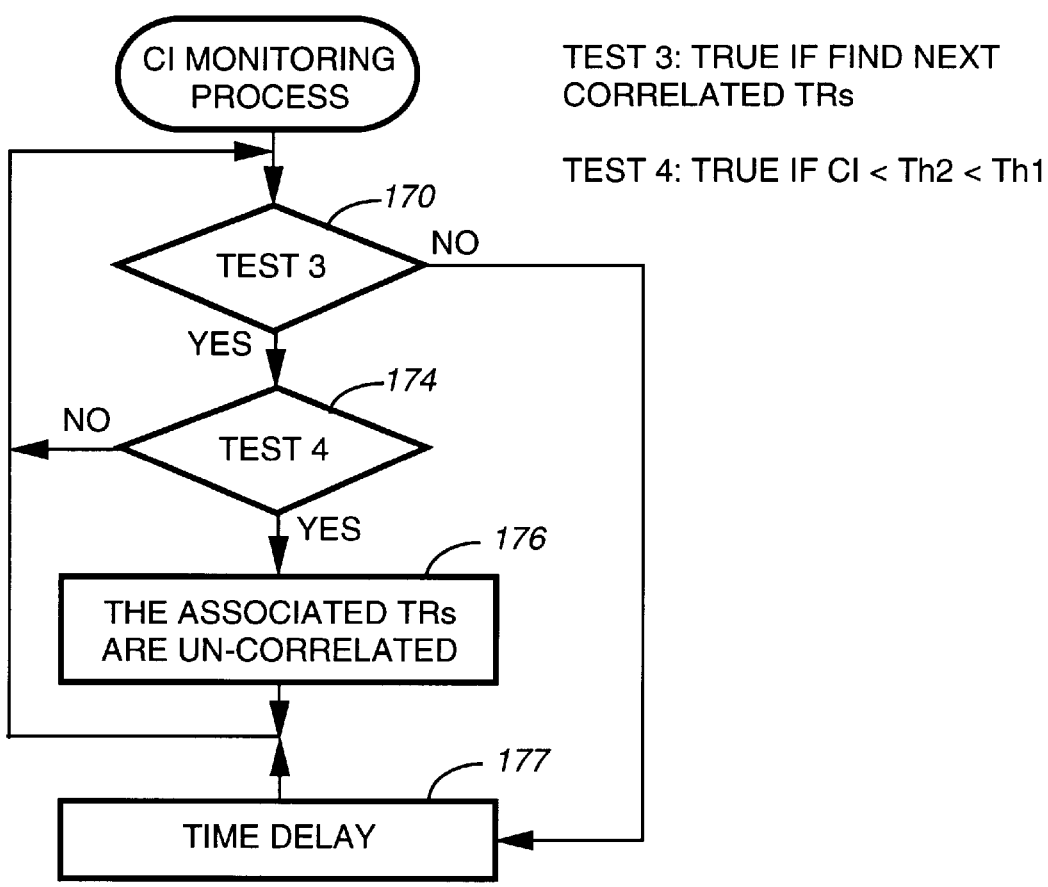
FIG. 12 is a flow chart illustrating a correlation indicator monitoring process.

The transmitter correlation indicators may become uncorrelated in accordance with the flow chart depicted in FIG. 12. As shown therein, the processor 46 determines at a block 170 whether it finds a pair of correlated transmitter units. If so, the processor 46 proceeds from block 170 to block 174. At block 174, the processor 46 determines whether the correlation indicator associated with the correlated transmitter units is less than a predetermined threshold, $Th_2$, which is less than the transmitter correlation threshold, $Th_1$. If so, the processor 46 at block 176 updates the memory 48 to indicate that the previously correlated transmitter unit are now uncorrelated. If at block 170 the processor 46 cannot find a pair of correlated transmitter units, the processor 170 proceeds to block 177 to wait for a predetermined period of time before checking to see if a pair of transmitter units have hence become correlated.

In order to process the out-bound message traffic, the system controller 40 first divides the out-bound message traffic into frame traffic as discussed above. Next, the message traffic to be sent out in a given frame is further divided into zone traffic based upon the location information of the portable devices intended to receive the out-bound messages. For example, a message intended for a portable device that is registered in a zone I is assigned to zone I as zone I out-bound message traffic. For every frame, the system controller 40 defines a zone priority function for each of the zones which are to transmit messages in a given frame. The zone priority function (ZPF) is an increasing function of both the traffic level and the latency situation as discussed above with respect to the transmitter units in accordance with the first embodiment of the present invention. The zone priority value is zero if there is no traffic for the zone. The system controller 40 then sorts the zones in accordance with decreasing zone priority values to form a zone traffic list (ZTL). The zone traffic list determines the order in which zones are assigned channels for transmitting out-bound messages to portable devices 42 so that the zone with a higher zone priority value will be served sooner than a zone with a lower zone priority value thereby improving the fairness of the channel allocation scheme. This embodiment of the second invention can be implemented by two different types of out-bound channels. In a first type of out-bound channel, there are multiple out-bound frequency sub-channels wherein each of the sub-channels is operated independently and any sub-set of the out-bound sub-channels can be used for any transmitter. Sub-channels are allocated for this type of out-bound channel system in accordance with the flow chart depicted in FIG. 13. The second kind of out-bound channel is such that there is one batch of out-bound sub-channels so that a transmitter uses all of the sub-channels or does not use any of them. For this second type of out-bound channel, sub-channels are assigned in accordance with the flow chart depicted in FIG. 14.

Figure 13:
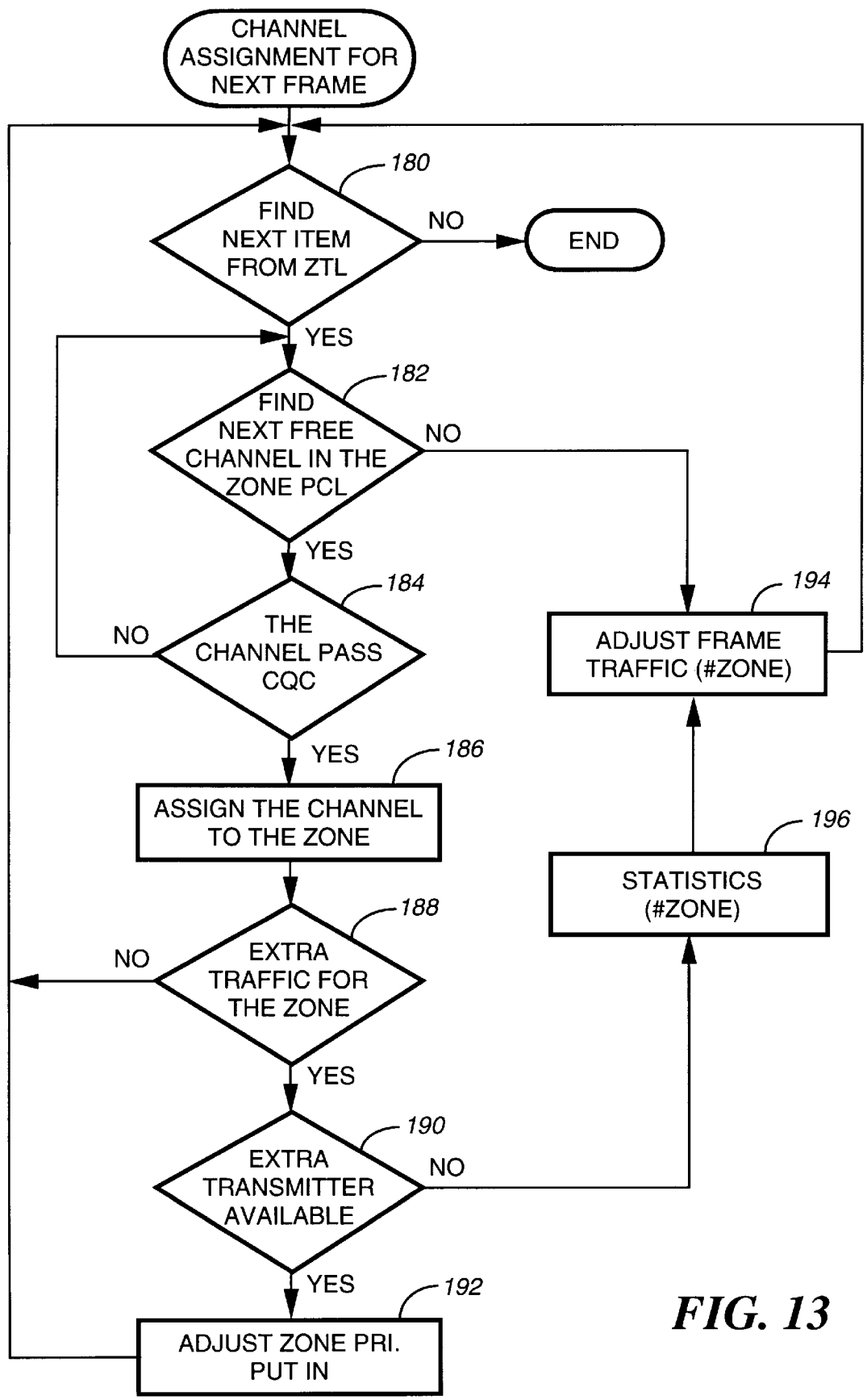
FIG. 13 is a flow chart illustrating a channel assignment algorithm for zones in a network in which multiple out-bound frequency sub-channels are operated independently and any sub-set of the out-bound sub-channels can be used for any of the transmitter units in the zones.

Sub-channels are assigned for the first type of out-bound channel in accordance with the flow chart depicted in FIG. 13 which is essentially the same as the flow chart depicted in FIG. 7 for the first embodiment of the present invention except that channels are assigned to zones that may include one or more transmitter units and the channel quality check is different as described below. More particularly, the system controller 40 assigns channels to a zone in accordance with the zone traffic list (ZTL). First, at a block 180, the processor 46 finds the highest priority zone in the zone traffic list and for that given zone proceeds to block 182 to find the highest priority free or available channel in the zone's preferred channel list. The zone preferred channel list may be derived as discussed above for the transmitter unit preferred channel list of the first embodiment of the present invention. More particularly, for each sub-channel that is accessible by the transmitter units of a zone, a channel priority value is calculated as a function of the probability of success for the zone and as a function of the mean quality margin for the zone. The quality margin may be set equal to the difference between a quality value q and a zone threshold value where the zone quality value q may be the highest received signal strength of an in-bound request received on the given sub-channel as measured by a receiver unit associated with a transmitter unit in the zone. The processor 46 sorts the zone channel priority values in decreasing order to form the zone priority list. At block 182, the processor 46 examines the zone priority channel list associated with the given zone to which a channel is to be assigned. The highest priority available sub-channel in the zone priority channel list is then proposed for assignment to the zone. At block 184, the processor 46 determines whether the proposed sub-channel passes the channel quality check for the given zone. In accordance with the second embodiment of the present invention, the channel quality check performed at block 184 is to assure that the proposed channel assignment will not interfere with the message traffic already assigned on a particular in-bound sub-channel. More particularly, the processor at block 184 implements a channel quality check to determine whether the given zone is correlated with any of the zones within which some traffic has been assigned on the same out-bound sub-channel i.e. whether the proposed channel has been assigned to a zone that is correlated with the zone in question. If so, the channel quality check fails. Otherwise, the channel quality check passes and the processor 46 assigns the proposed sub-channel to the given zone at block 186.

After assigning a channel to a zone, the processor 46 proceeds from block 186 to block 188. At block 188, the processor 46 determines whether more than one channel is needed for the zone because there are still a number of out-bound messages that remain to be transmitted by the transmitter unit(s) of the zone. If not, the processor 46 proceeds back to block 180 to allocate a frequency sub-channel to the next zone in the ordered zone traffic list. However, if the processor 46 determines at block 188 that there is still more message traffic for the transmitter units of the zone to send, the processor 46 proceeds from block 188 to block 190. At block 190, the processor 46 determines whether there is an extra transmitter available. If so, the processor 46 proceeds to block 192 to adjust the zone priority value and the zone is inserted back into the ordered zone traffic list according to its adjusted priority value so that another frequency channel can be assigned thereto. If the zone does not have an extra channel available thereto for transmission at the same time, the processor 46 proceeds from block 190 to block 196. At block 196 the processor updates the memory 48 to store information indicating that the zone may need to be altered as discussed below. Thereafter, the processor 46 proceeds to block 194 to put the extra out-bound message traffic in a later frame associated with the portable device to whom the message is to be transmitted.

Figure 14:
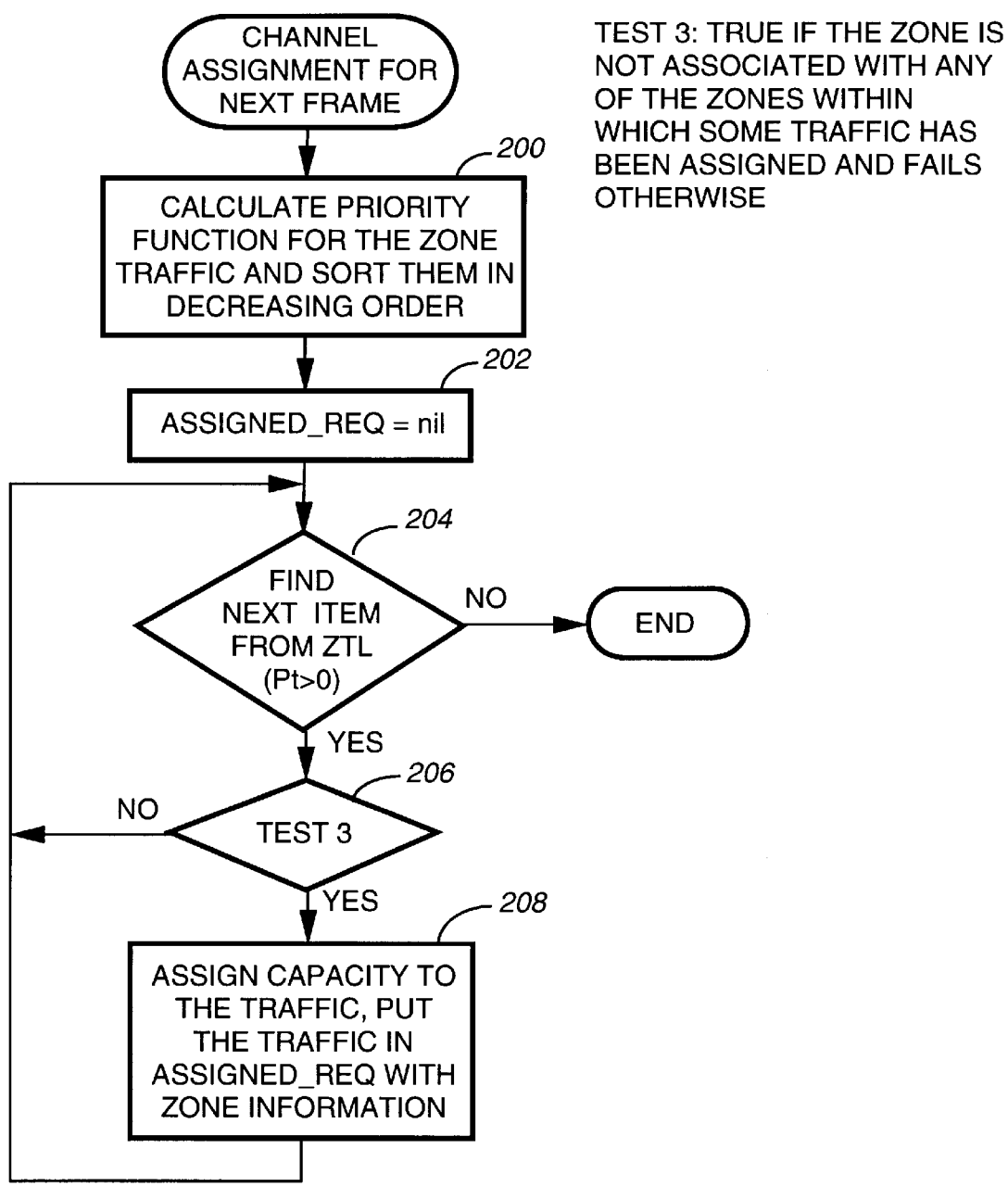
FIG. 14 is a further embodiment of a channel assignment algorithm for zones in a network in which there is one batch of out-bound sub-channels such that a transmitter unit uses all of the sub-channels or none of them.

In accordance with the flow chart depicted in FIG. 14 for the second type of out-bound channel, the processor 46 calculates a zone priority value for each of the zones having message traffic to transmit in a given frame. At block 200 the processor also sorts the zones in decreasing order of their zone priority value. At a block 202, the processor 46 initializes an assigned request list so that it is empty and thereafter proceeds to block 204. At block 204, the processor 46 finds the highest priority zone that has yet to be serviced from the zone traffic list formed at block 200. For that given zone, the processor 46 implements a test 3 at block 206 to determine if the given zone is correlated with any of the zones within which some traffic has been assigned. If the given zone is not correlated with any zone within which some traffic has already been assigned, the processor 46 proceeds from block 206 to block 208 to assign to the given zone the requisite blocks of the frame necessary to transmit the out-bound message traffic. At block 208 the zone's assigned traffic information is also added to the assigned request list.

New zones may be formed and reformed by merging and dividing existing zones so as to allow the system to evolve as customer demands grow. The zones are merged and divided in such a way that the system capacity is increased and the inter-zone interference is within tolerance to provide better channel quality. Thus, according to the following features of the present invention, the quality of the service is maintained and improves even as the customer demands on the system increase.

Figure 15A:
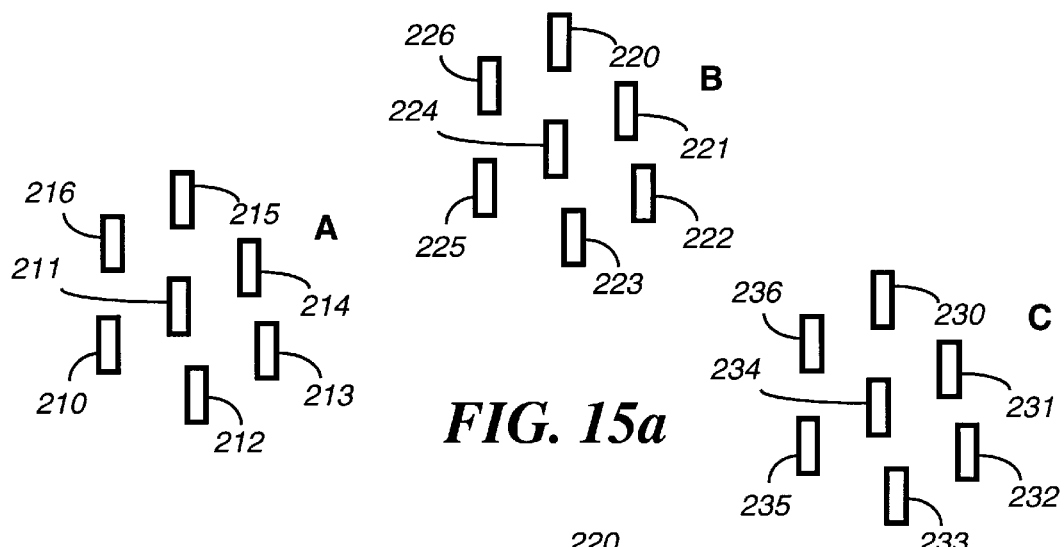
FIGS. 15A–15C respectively illustrate multiple transmitter groups, zones and zone groups.

Whether two zones can be merged or whether a single zone can be divided, depends upon a number of factors including whether a zone is associated with one or more transmitter groups and whether a zone changes from an independent zone to a dependent zone among other factors. A transmitter group is the union of all correlated transmitter units such that a transmitter unit K is an element of a transmitter group if the transmitter unit K is correlated with another transmitter unit in that group. As discussed above, transmitter units are correlated if the transmitter correlation indicator (CI) is greater than the transmitter correlation threshold. The transmitter correlation indicator is increased if multiple transmitters are involved in an in-bound request wherein a transmitter is involved in an in-bound request if at least one of its associated receiver units is the primary or secondary receiver of an in-bound channel request. FIG. 15A illustrates three transmitter groups, transmitter group A containing transmitter units 210–216; transmitter group B containing transmitter units 220–226 and transmitter group C containing transmitter units 230–236.

Figure 15B:
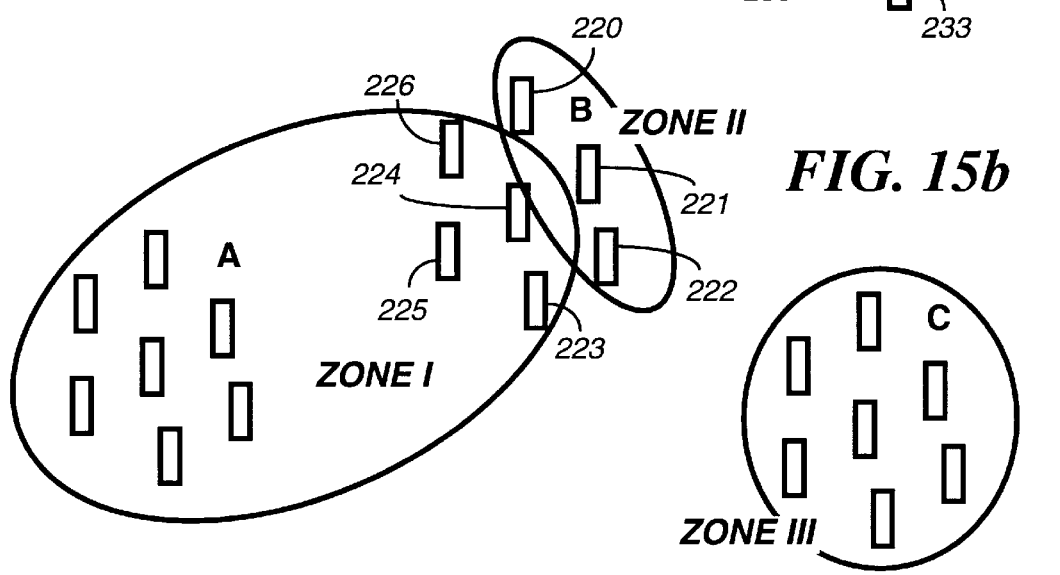

As discussed in more detail above, multiple zones are correlated if at least one transmitter unit in each of the multiple zones interferes with each other. Correlated zones are dependent zones and they are also said to be in the same zone group. Zones in the same zone group need shared bandwidth. A zone is independent if it is not correlated with any other zone. FIG. 15B illustrates three zones, zone I, zone II and zone III. As can be seen, zone I includes all of the transmitter units in the transmitter group A as well as the transmitter units 223–226 of the transmitter group B. Zone II includes the transmitters 220–222 of the transmitter group B and the area of coverage of zones I and II overlap i.e. zones I and II are correlated. Zone III includes all of the transmitters in the transmitter group C and no other transmitter units. As seen from FIG. 15C, zones I and II form a zone group 1 since at least one of the transmitter units 223–226 of zone I interfere with at least one of the transmitter units 220–222 by definition since these transmitter units are in the same transmitter group B. Zone III however, is an independent zone since it is not correlated with any other zone. Zone III forms a zone group 2 by itself.

A zone is dividable if it is associated with more than one transmitter group. That is, if two or more transmitter groups each have a transmitter unit in common with the transmitter set of a given zone, then that given zone is dividable. As can be seen from FIG. 15B–15C, zone I is dividable since it includes transmitter units from two distinct transmitter groups, transmitter group A and transmitter group B. Zone II and zone III are not dividable, however, since zone II only contains transmitter units in the transmitter group B and zone III only includes transmitter units in the transmitter group C.

Figure 16:
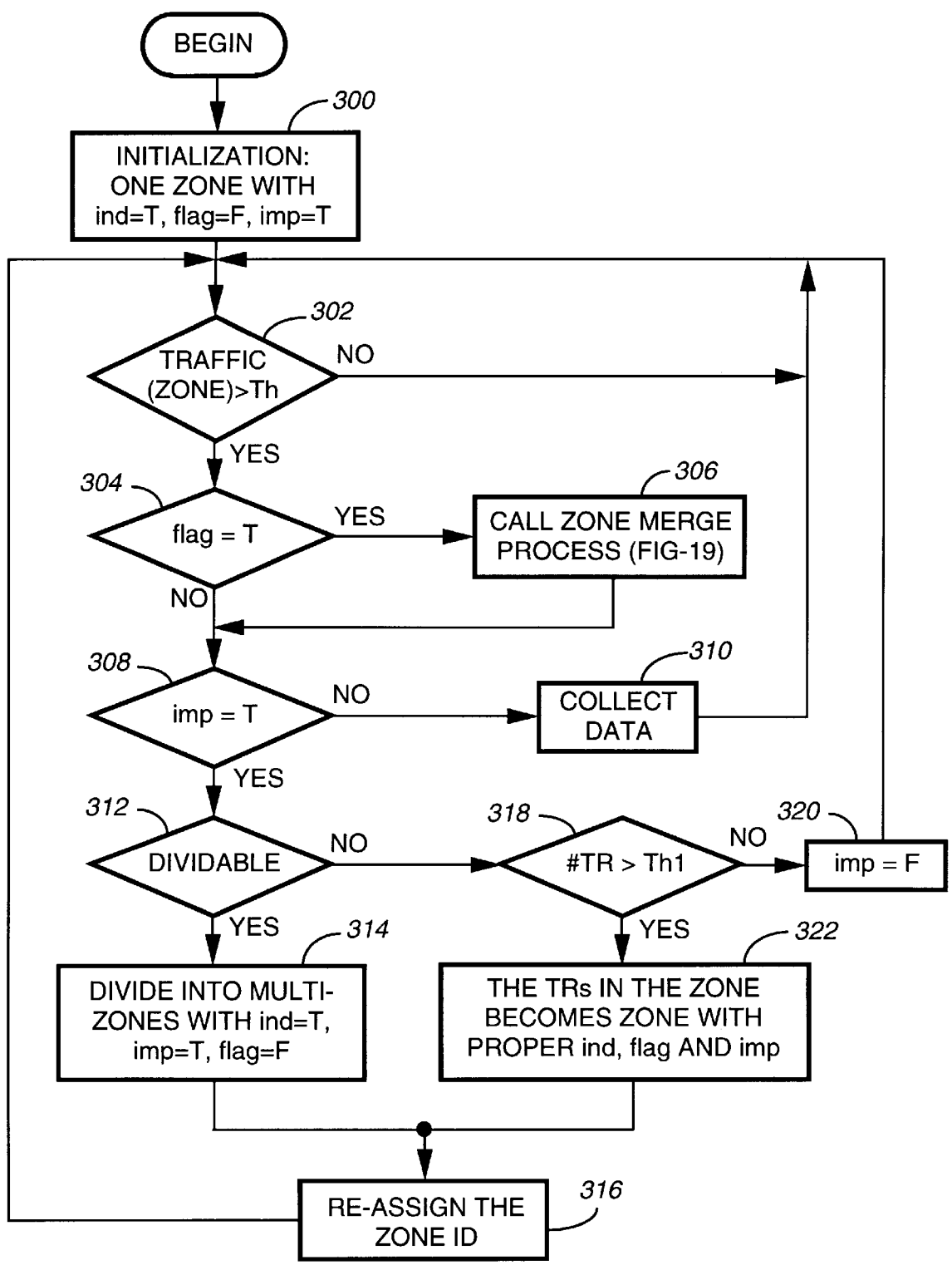
FIG. 16 is a flow chart illustrating a scheme for splitting zones.
Figure 17:
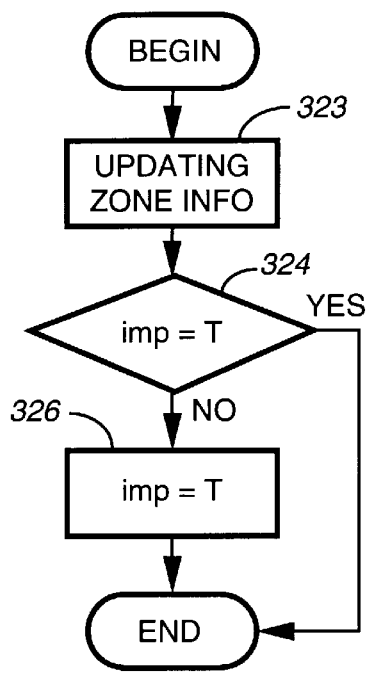
FIG. 17 is flow chart illustrating the updating of zone information when a new transmitter unit and associated receiver units are added to a zone.
Figure 18:
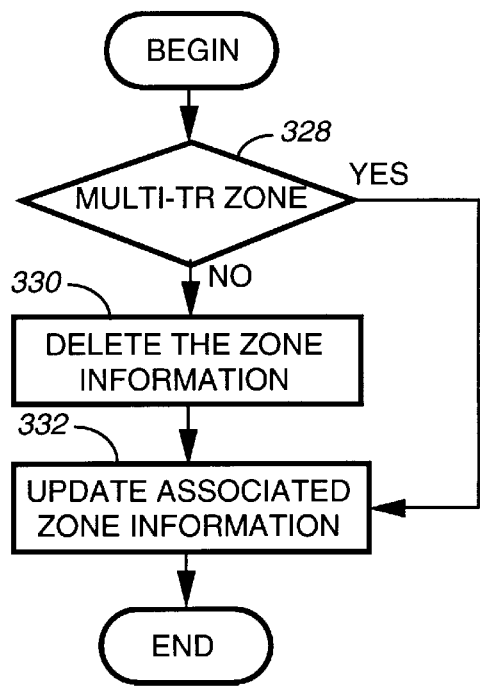
FIG. 18 is a flow chart illustrating the updating of zone information when a transmitter unit and associated receiver units are removed from a zone.

Transmitter units are partitioned into zones that are divided and merged in accordance with the flow charts depicted in FIGS. 16–18. When the system is first installed, it is initialized such that there is only one zone which is independent and most likely dividable. Due to the initial low customer traffic demand, the number of the transmitter units and accordingly, the cost of the infrastructure may be minimized for a desired area of coverage. There is no need for the registration of the location of portable devices 42 and the control channel is simulcast throughout the system. The out-bound traffic can be simulcast throughout the system as described above with respect to the second embodiment of the present invention although this is not necessary. As the message traffic demand increases, the capacity of the system can be increased by splitting the existing zone or zones. Zones are split in a way such that the system capacity is increased and the inter-zone interference is within tolerance so as to maintain or improve the channel quality. More specifically, an existing zone is split into mutually independent zones such that the transmitter units in one new zone are not correlated to any transmitter unit in another new zone from which it was split.

FIG. 16 illustrates the operation of the system in splitting zones and collecting statistical information. The system controller processor 46 at block 300 initializes the system so that there is one zone with a first flag representing the independence of the zone set equal to true; a second flag used to determine whether a zone is to be merged set equal to false; and a third flag representing whether the zone is improvable set equal to true. At a block 302 the processor 46 determines whether the zone message traffic is greater than a splitting threshold $Th_{s1}$. If so, the processor 46 determines at a block 304 whether the second flag is true and if so proceeds to block 306 to implement the zone merge process algorithm depicted in FIG. 19 as discussed below. If the processor 46 determines at block 304 that the second flag was set equal to false, the processor proceeds to block 308 from block 304. At block 308, the processor 46 determines whether the third flag was set equal to true indicating that the zone is improvable. If the third flag indicates that the zone is not improvable, the processor at block 310 collects data for further use. For example, the data collected at block 310 may be utilized to determine whether one or more transmitter units should be added to the zone. If the processor 46 determines at block 308 that the zone is improvable, the processor proceeds to block 312 to determine if the zone is dividable. As discussed above, a zone is dividable if it is associated with more than one transmitter group such that two or more transmitter groups each have a transmitter unit in common with the transmitter set of the zone. If the zone is determined to be dividable at block 312, the processor 46 divides the zone at block 314 into multiple, mutually independent zones wherein each of these new, mutually independent zones has its first flag set equal to true indicating that it is independent; its second flag set equal to false indicating that it is not ready to be merged; and its third flag set equal to true indicating that the new zone is improvable. Each of the new mutually independent zones is then reassigned a new zone identification at block 316 by the processor 46.

If the processor 46 determines at block 312 that a zone is not dividable, the processor proceeds to block 318 to determine whether the number of transmitters in the zone is greater than a second predetermined splitting threshold $Th_{s2}$. The second splitting threshold $Th_{s2}$ may be a function of the system reuse factor. For example, one possible definition may be $Th_{s2}$=k×reuse factor.

The fact that the number of transmitters in the zone is greater than the threshold $Th_{s2}$ is an indication that splitting the zones into a number of zones each having only a single transmitter unit and with shared bandwidth will improve the system capacity. Therefore, if the processor determines at block 318 that the number of transmitter units in a zone is greater than the threshold $Th_{s2}$, the processor proceeds to block 322 to split the zone into multiple zones each having a single transmitter unit. The flags for each of these single transmitter unit zones are set as follows. The first flag is set equal to false indicating that the new single transmitter zone is undividable; the second flag is set equal to false and the third flag is set equal to false indicating that the new single transmitter zone is unimprovable. Further, the zone correlation indicator of each new single transmitter zone is set equal to the value of the transmitter correlation indicator associated with the transmitter unit contained in the zone. For example, if two transmitter units in a zone are correlated before splitting the zone at block 322 into two single transmitter zones, the two single transmitter zones are correlated. From block 322, the processor proceeds to block 316 to assign new zone IDs to each of the new single transmitter zones. If the processor 46 determines at block 318 that the number of transmitter units in the zone is not greater than the threshold $Th_{s2}$, the processor proceeds to block 320 to change the third flag to false indicating that the zone is not improvable. Thereafter, the processor 46 determines at block 319 whether the zone is correlated with another zone. If the zone is correlated with another zone, a zone merge may be initiated by setting a flag equal to true at block 317.

When a new transmitter and its associated receivers are added to an existing zone to increase the capacity of the zone or the coverage area thereof, the system controller processor 46 operates in accordance with the flow chart depicted in FIG. 17. At a block 323, the processor 46 updates the zone information to include the new transmitter unit and proceeds to block 324 to determine whether the third flag associated with the zone indicates that the zone is improvable. If so, the processor 46 exits the routine. Otherwise, the processor proceeds from block 324 to block 326 to change the third flag to indicate that the zone is now improvable. If a transmitter unit and its associated receiver unit are removed from a zone, the processor 46 operates in accordance with the flow chart depicted in FIG. 18. At a block 328, the processor 46 determines whether the zone is a multi-transmitter zone or a zone having only a single transmitter contained therein. If the processor determines that the zone is a multi-transmitter zone, the processor proceeds to block 332 to update the information associated with the zone. If the processor 46 determines at block 328 that the zone is a single transmitter zone, the processor deletes the information associated with the zone from the system at block 330 and then proceeds to block 332 to update other associated zone information if needed. It is noted that the information associated with a zone may be updated by the system controller 40 on other occasions as well.

Figure 15C:
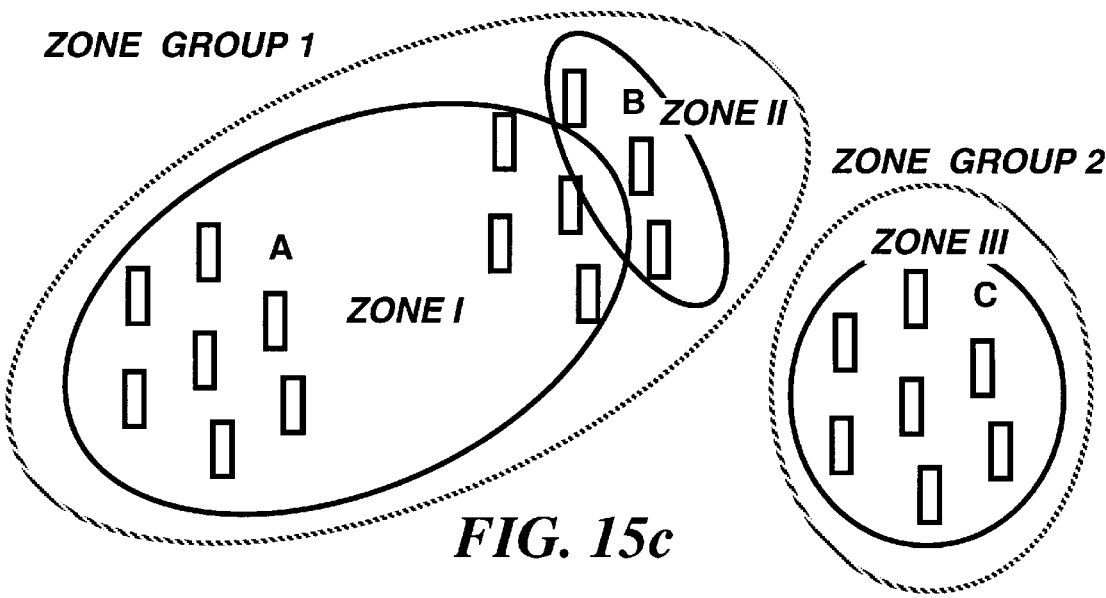
Figure 19:
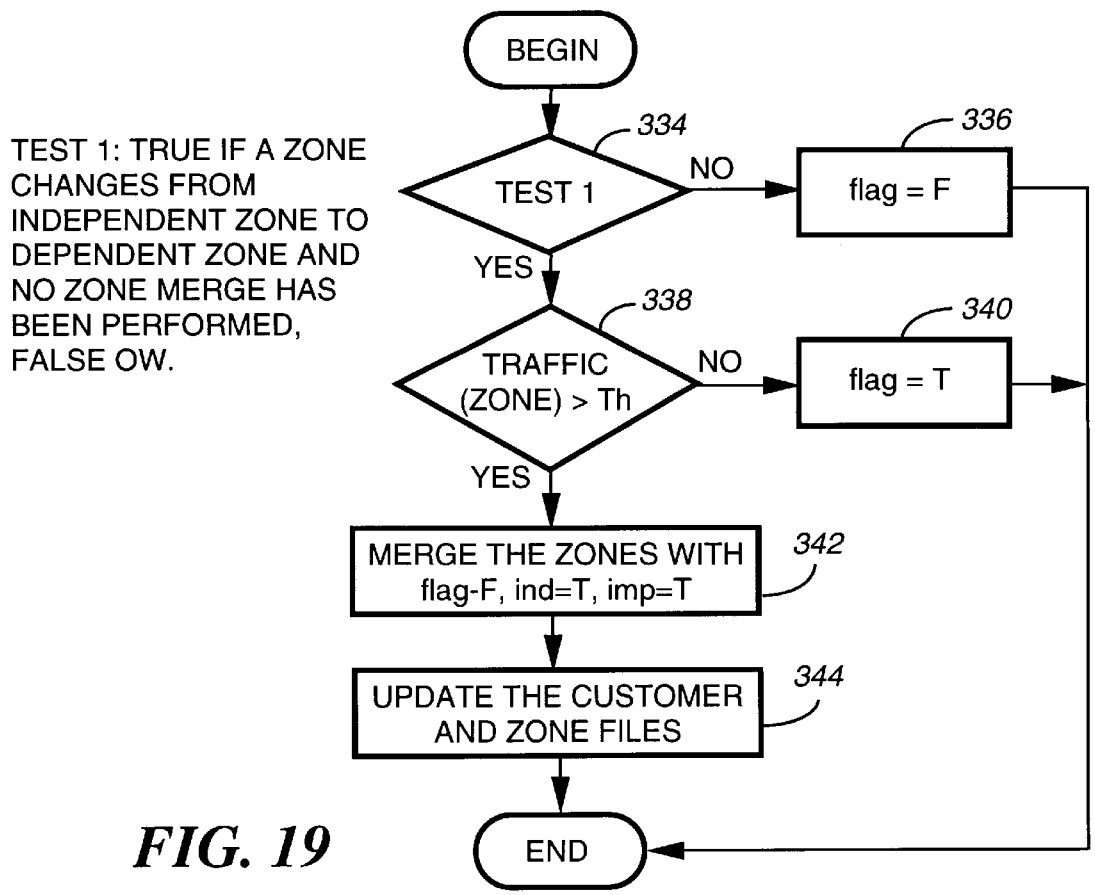
FIG. 19 is a flow chart illustrating a scheme for merging zones.

The zone merge process is depicted in FIG. 19. For example, zones I and II as depicted in FIGS. 15B–C in zone group 1 may be merged if a higher system capacity is desired. After merging the zones I and II into a new, combined zone, the new zone may be dividable and if dividable, the new zone will be split into multiple zones different from the original zones I and II so as to achieve higher system capacity and better channel quality. Even if the new merged or combined zone is not dividable, the increased number of transmitters in the new combined zone resulting from the merge may qualify the new zone to be split into single transmitter zones at block 322 of FIG. 16. As such, the system capacity and service quality will improve.

As shown in FIG. 19, two conditions must be met for zones to be merged. The first condition is that a given zone, designated as a first zone, changes from an independent zone to a dependent zone indicating that the first zone is now correlated with at least one other zone, indicated as the second zone, and that a zone merge has not been performed in association with the first zone. If this test is met, the processor proceeds from block 334 to block 338. Otherwise, the processor proceeds from block 334 to block 336 to set the second flag to false. The second condition for a zone merge is performed at block 338 if the first condition is determined to be met at block 334. Specifically, the second condition is that the traffic in the associated first or second zones must be greater than a merge threshold $Th_{s1}$. If it is not, the processor 46 proceeds to block 340 to set the second flag equal to true so that the system will continuously monitor the associated first and second zones to determine when the zone traffic does increase above the merge threshold so that a merge can be accomplished. If both the first and second conditions are met as determined at blocks 334 and 338, the processor 46 proceeds to block 342 to merge the associated zones into a new single zone with the first flag set equal to true indicating that the zone is independent, the second flag being set equal to false indicating that the new zone is not ready to be merged again and the third flag being set equal to true indicating that the new zone is improvable. Thereafter, the processor 46 proceeds to block 344 to update the customer and zone files stored in the memory 48 of the system. The customer and zone files include the zone identification information, customer registration information, etc.

As can be seen from the above description, the channel allocation scheme of the present invention provides good quality with low cost and complexity while having a high message capacity. Further, the system is adaptive to changing environments and the resulting changes in the demands on the system so that the initial installation costs may be minimized and yet the system can easily evolve to accommodate increasing customer demands. Many modifications and variations of the present invention are possible in light of the above teachings. Thus, it is to be understood that, within the scope of the appended claims, the invention may be practiced otherwise than as described hereinabove.

What is claimed and desired to be secured by Letters Patent is:

1. In a radio frequency communication network having a plurality of transmitter and receiver units for communication with a portable two-way selective call communication device, a method for allocating a plurality of frequency channels to a plurality of said transmitter units for which there is a demand that the transmitter units transmit messages comprising:

grouping said plurality of transmitter units in a plurality of zones, each zone including one or more transmitter units for simulcasting messages, wherein said grouping step further includes: determining whether a first zone has a demand for the transmission of messages by the transmitter units in the zone that is greater than a predetermined demand threshold; and determining whether the first zone is dividable if said first zone has a demand that is greater than said demand threshold; and splitting said first zone into a second and a third zone if said first zone is determined to be dividable, said second and third zones not being correlated;

determining which of said zones if any are correlated;

determining whether a channel proposed for assignment to a given zone is currently assigned to another zone that is correlated with said given zone; and assigning said proposed channel to said given zone if said proposed channel is not currently assigned to another zone that is correlated with said given zone.

2. A method for allocating channels to a plurality of transmitter units in a radio frequency communication network as recited in claim 1 wherein said step of determining whether zones are correlated includes the steps of assigning a zone correlation indicator to a pair of zones and comparing said zone correlation indicator to a threshold value, said pair of zones being correlated if said zone correlation indicator is greater than said threshold.

3. A method for allocating channels to a plurality of transmitter units in a radio frequency communication network as recited in claim 1 wherein each of said transmitter units has one or more receiver units associated therewith and further including the steps of:

measuring at the receiver units a quality value representing the quality of an intercepted in-bound message transmitted by a portable two-way selective call communication device;

reporting by the receiver units to a network controller the quality value measured for an intercepted in-bound message; and determining at a network controller whether a first receiver unit associated with a first transmitter unit in a first zone reported the interception of the same in-bound message as intercepted and reported by a second receiver unit associated with a second transmitter unit in a second zone, said network determining whether said first and second receiver units zones are correlated based on said determination of whether said first and second receiver units intercepted and reported the same in-bound message and based on reported quality values.

4. A method for allocating channels to a plurality of transmitter units in a radio frequency communication network as recited in claim 1 wherein said step of determining whether zones are correlated includes the step of determining whether one transmitter unit in one zone interferes with another transmitter unit in another zone, said zones being correlated if said one transmitter unit interferes with said other transmitter unit.

5. A method for allocating channels to a plurality of transmitter units in a radio frequency communication network as recited in claim 1 further including the steps of:

determining whether the number of transmitter units in said first zone is greater than a predetermined transmitter number threshold if said first zone is determined to be undividable; and splitting said first zone into a plurality of zones each having a single transmitter unit therein if said number of transmitter units in said first zone is greater than said predetermined transmitter number threshold.

6. A method for allocating channels to a plurality of transmitter units in a radio frequency communication network as recited in claim 1 further including the step of:

merging one zone with another zone into a combined zone if said one zone and said other zone become correlated after being determined to be uncorrelated and the demand for the transmission of messages by the transmitter units of said one zone or said other zone is greater than a predetermined threshold.

7. In a radio frequency communication network having a plurality of transmitter and receiver units for communication with a portable two-way selective call communication device, a system for allocating a plurality of frequency channels to a plurality of said transmitter units for which there is a demand that the transmitter units transmit messages comprising:

means for grouping said plurality of transmitter units in a plurality of zones, each zone including one or more transmitter units for simulcasting messages, wherein said grouping means further includes: means for determining whether a first zone has a demand for the transmission of messages by the transmitter units in the zone that is greater than a predetermined demand threshold; means for determining whether said first zone is dividable if said first zone has a demand that is greater than said demand threshold; and means for splitting said first zone into a second and a third zone if said first zone is determined to be dividable, said second and third zones not being correlated;

means for determining which of said zones if any are correlated;

channel assignment means for determining whether a channel proposed for assignment to a given zone is currently assigned to another zone that is correlated with said given zone, said channel assignment means assigning said proposed channel to said given zone if said proposed channel is not currently assigned to another zone that is correlated with said given zone.

8. A system for allocating channels to a plurality of transmitter units in a radio frequency communication network as recited in claim 7 wherein said channel assignment means includes means for assigning a zone correlation indicator to a pair of zones and comparing said zone correlation indicator to a threshold value, said pair of zones being correlated if said zone correlation indicator is greater than said threshold.

9. A system for allocating channels to a plurality of transmitter units in a radio frequency communication network as recited in claim 7 wherein said channel assignment means includes means for determining whether one transmitter unit in one zone interferes with another transmitter unit in another zone, said zones being correlated if said one transmitter unit interferes with said other transmitter unit.

10. A system for allocating channels to a plurality of transmitter units in a radio frequency communication network as recited in claim 7 further including:

means for determining whether the number of transmitter units in said first zone is greater than a predetermined transmitter number threshold if said first zone is determined to be undividable and said splitting means splits said first zone into a plurality of zones each having a single transmitter unit therein if said number of transmitter units in said first zone is greater than said predetermined transmitter number threshold.

11. A system for allocating channels to a plurality of transmitter units in a radio frequency communication network as recited in claim 7 further including means for merging one zone with another zone into a combined zone if said one zone and said other zone become correlated after being determined to be uncorrelated and the demand for the transmission of messages by the transmitter units of said one zone or said other zone is greater than a predetermined threshold.

12. In a radio frequency communication network having a plurality of transmitter units and associated receiver units for communicating with a portable two-way selective call receiving device, a system for organizing said transmitter units to assign frequency channels thereto for transmission of messages comprising:

means for determining whether a first transmitter unit is correlated with a second transmitter unit;

means for assigning correlated transmitter units to a transmitter group;

means for assigning transmitter units to a zone including:
means for determining whether a first zone has a demand for the transmission of messages that is greater than a predetermined threshold demand;
means for determining whether said first zone is dividable based upon whether said first zone has at least two transmitter units each of which is assigned to a different transmitter group; and
means for splitting said first zone into a second zone and a third zone that are not correlated if a said first zone is determined to be dividable.

13. A system for organizing transmitter units in a radio frequency communication network as recited in claim 12 wherein said means for assigning transmitter units to a zone further includes means for determining whether the number of transmitter units in said first zone is greater than a predetermined transmitter number threshold if said first zone is determined to be undividable and said splitting means splits said first zone into a plurality of zones each having a single transmitter unit therein if said number of transmitter units in said first zone is greater than said predetermined transmitter number threshold.

14. A system for organizing a plurality of transmitter units in a radio frequency communication network as recited in claim 12 wherein said means for assigning transmitter units to a zone further includes means for merging one zone with another zone into a combined zone if said one zone and said other zone become correlated after being determined to be uncorrelated and the demand for the transmission of messages by the transmitter units of said one zone or said other zone is greater than a predetermined threshold.

* * * * *